(12) United States Patent
Demaster-Smith et al.

(10) Patent No.: US 12,345,896 B2
(45) Date of Patent: Jul. 1, 2025

(54) HEAD-MOUNTED DISPLAY ALIGNMENT ASSESSMENT

(71) Applicant: Microsoft Technology Licensing, LLC, Redmond, WA (US)

(72) Inventors: Rayna Demaster-Smith, Kirkland, WA (US); Dmitriy Churin, Redmond, WA (US); James Peele Terrell, Jr., Bellvue, CO (US); Michael Scott Sutton, Arvada, CO (US); Parry Byron Johnson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 524 days.

(21) Appl. No.: 17/804,836

(22) Filed: May 31, 2022

(65) Prior Publication Data

US 2023/0273444 A1 Aug. 31, 2023

Related U.S. Application Data

(63) Continuation-in-part of application No. 17/652,901, filed on Feb. 28, 2022.

(51) Int. Cl.
*H04N 13/344* (2018.01)
*G02B 27/01* (2006.01)
(Continued)

(52) U.S. Cl.
CPC ..... *G02B 27/0179* (2013.01); *G02B 27/0172* (2013.01); *G06F 3/012* (2013.01);
(Continued)

(58) Field of Classification Search
CPC ............. G02B 27/0179; H04N 13/366; H04N 13/344; G06F 3/012
(Continued)

(56) References Cited

U.S. PATENT DOCUMENTS 8,576,143 B1 11/2013 Kelly
10,623,722 B2 4/2020 Markovsky
(Continued)

FOREIGN PATENT DOCUMENTS

CN 107314743 A 11/2017

OTHER PUBLICATIONS

U.S. Appl. No. 17/829,325, filed May 31, 2022.
(Continued)

*Primary Examiner* — Christopher M Raabe

(74) *Attorney, Agent, or Firm* — Alleman Hall & Tuttle LLP

(57) ABSTRACT

A head-mounted display system includes a left display assembly configured to provide left-side display light. A first left inertial measurement unit (IMU) is configured to measure an orientation of the left display assembly. A right display assembly is configured to provide right-side display light. A first right IMU is configured to measure an orientation of the right display assembly. A communication interface is configured to receive a left-side orientation of a head-tracking system as measured by a second left IMU, and a right-side orientation of a head-tracking system as measured by a second right IMU. A logic machine is configured to assess an alignment of the head-mounted display system based at least in part on the orientation of the left display assembly, the orientation of the right display assembly, the left-side orientation of the head-tracking system, and the right-side orientation of the head-tracking system.

20 Claims, 17 Drawing Sheets

(51) Int. Cl.
  *G06F 3/01* (2006.01)
  *H04N 13/327* (2018.01)
  *H04N 13/366* (2018.01)
  *G02F 1/1362* (2006.01)

(52) U.S. Cl.
  CPC ......... *H04N 13/327* (2018.05); *H04N 13/344* (2018.05); *H04N 13/366* (2018.05); *G02B 2027/0134* (2013.01); *G02B 2027/0138* (2013.01); *G02B 2027/0178* (2013.01); *G02B 2027/0187* (2013.01); *G02F 1/136277* (2013.01)

(58) Field of Classification Search
  USPC .......................................................... 349/51
  See application file for complete search history.

(56) References Cited

U.S. PATENT DOCUMENTS

| | | |
|---|---|---|
| 11,202,043 B1 | 12/2021 | Elazhary et al. |
| 2013/0215730 A1 | 8/2013 | Okamoto et al. |
| 2015/0103330 A1 | 4/2015 | Wilks et al. |
| 2016/0170103 A1 | 6/2016 | Gill et al. |
| 2017/0212225 A1 | 7/2017 | Sommer et al. |
| 2020/0018968 A1 | 1/2020 | Edwin et al. |
| 2020/0110361 A1 | 4/2020 | Georgiou et al. |
| 2020/0142298 A1 | 5/2020 | Valentine et al. |
| 2020/0201042 A1 | 6/2020 | Wang et al. |
| 2021/0165222 A1 | 6/2021 | Jarvenpaa |
| 2022/0377312 A1 | 11/2022 | Samples et al. |
| 2023/0273433 A1 | 8/2023 | Terrell, Jr. |
| 2023/0288705 A1* | 9/2023 | Wang ................... G02B 5/1842 |
| 2024/0171726 A1* | 5/2024 | Hernandez ........... H04N 13/366 |

OTHER PUBLICATIONS

Non-Final Office Action mailed on Sep. 23, 2024, in U.S. Appl. No. 17/652,901, 16 pages.

"Notice of Allowance Issued in U.S. Appl. No. 17/829,325", Mailed Date: Mar. 23, 2023, 9 Pages.

"International Search Report and Written Opinion Issued in PCT Application No. PCT/US22/051118", Mailed Date: Mar. 30, 2023, 12 Pages.

"International Search Report and Written Opinion Issued in PCT Application No. PCT/US22/051119", Mailed Date: Mar. 20, 2023, 15 Pages.

Wang, et al., "Light field image sensors based on the talbot effect", In Publication of Optical Society of America, Nov. 1, 2009, pp. 1-20.

Whyte, Refael, "Phase Wrapping and its Solution for Indirect Time-of-Flight Depth Sensing", Retrieved From: https://medium.com/chronoptics-time-of-flight/phase-wrapping-and-its-solution-in-time-of-flight-depth-sensing-493aa8b21c42, Nov. 24, 2020, 11 Pages.

* cited by examiner

500

```
┌─────────────────────────────────────────────────────────────┐
│ EMIT LEFT-SIDE DISPLAY LIGHT AND LEFT-SIDE TEST LIGHT AT    │
│ LEFT DISPLAY ASSEMBLY                                        │
│                                                         502  │
└─────────────────────────────────────────────────────────────┘
                              │
                              ▼
┌─────────────────────────────────────────────────────────────┐
│ EMIT RIGHT-SIDE DISPLAY LIGHT AND RIGHT-SIDE TEST LIGHT AT  │
│ RIGHT DISPLAY ASSEMBLY                                       │
│                                                         504  │
└─────────────────────────────────────────────────────────────┘
                              │
                              ▼
┌─────────────────────────────────────────────────────────────┐
│ MEASURE LEFT-SIDE TEST LIGHT AT LEFT OPTICAL SENSOR         │
│                                                         506  │
└─────────────────────────────────────────────────────────────┘
                              │
                              ▼
┌─────────────────────────────────────────────────────────────┐
│ MEASURE RIGHT-SIDE TEST LIGHT AT RIGHT OPTICAL SENSOR       │
│                                                         508  │
└─────────────────────────────────────────────────────────────┘
                              │
                              ▼
┌─────────────────────────────────────────────────────────────┐
│ ASSESS LEFT-SIDE POTENTIAL MISALIGNMENT BETWEEN LEFT        │
│ DISPLAY ASSEMBLY AND LEFT WAVEGUIDE                          │
│                                                         510  │
└─────────────────────────────────────────────────────────────┘
                              │
                              ▼
┌─────────────────────────────────────────────────────────────┐
│ ASSESS RIGHT-SIDE POTENTIAL MISALIGNMENT BETWEEN RIGHT      │
│ DISPLAY ASSEMBLY AND RIGHT WAVEGUIDE                         │
│                                                         512  │
└─────────────────────────────────────────────────────────────┘
                              │
                              ▼
┌─────────────────────────────────────────────────────────────┐
│ ASSESS STEREO ALIGNMENT BETWEEN LEFT DISPLAY ASSEMBLY       │
│ AND RIGHT DISPLAY ASSEMBLY                                   │
│                                                         514  │
└─────────────────────────────────────────────────────────────┘
```

```
┌─────────────────────────────────────────────────────────────┐
│ MEASURE AN ORIENTATION OF A LEFT DISPLAY ASSEMBLY VIA A    │
│ LEFT INERTIAL MEASUREMENT UNIT (IMU)                        │
│                                                        1002 │
└─────────────────────────────────────────────────────────────┘
                              │
                              ▼
┌─────────────────────────────────────────────────────────────┐
│ MEASURE AN ORIENTATION OF A RIGHT DISPLAY ASSEMBLY VIA A   │
│ RIGHT IMU                                                   │
│                                                        1004 │
└─────────────────────────────────────────────────────────────┘
                              │
                              ▼
┌─────────────────────────────────────────────────────────────┐
│ RECEIVE A LEFT-SIDE ORIENTATION OF A HEAD-TRACKING          │
│ SYSTEM AS MEASURED BY A SECOND LEFT IMU AND A RIGHT-SIDE    │
│ ORIENTATION OF A HEAD-TRACKING SYSTEM AS MEASURED BY A      │
│ SECOND RIGHT IMU                                       1006 │
└─────────────────────────────────────────────────────────────┘
                              │
                              ▼
┌─────────────────────────────────────────────────────────────┐
│ ASSESS ALIGNMENT OF HEAD-MOUNTED DISPLAY SYSTEM             │
│                                                        1008 │
└─────────────────────────────────────────────────────────────┘
```

FIG. 10

HEAD-MOUNTED DISPLAY ALIGNMENT ASSESSMENT

CROSS REFERENCE TO RELATED APPLICATIONS

This application is a continuation-in-part of U.S. patent application Ser. No. 17/652,901, filed Feb. 28, 2022, the entirety of which is hereby incorporated herein by reference for all purposes.

BACKGROUND

Head-mounted display systems present left and right images to a viewer's left and right eyes. By carefully controlling the positions of the left and right images in the user's field of view, the images can be processed by the viewer's brain in a way that gives the perception of three-dimensional depth. However, if one or both of the images is displayed with any stereo misalignment, the resulting viewing experience can be unpleasant, even causing a feeling of sickness. One source of potential stereo misalignment occurs when a frame or other aspect of the head-mounted display flexes, bends, or otherwise moves out of a calibrated state.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A head-mounted display system includes a left display assembly configured to provide left-side display light. A first left inertial measurement unit (IMU) is configured to measure an orientation of the left display assembly. A right display assembly is configured to provide right-side display light. A first right IMU is configured to measure an orientation of the right display assembly. A communication interface is configured to receive a left-side orientation of a head-tracking system as measured by a second left IMU, and a right-side orientation of a head-tracking system as measured by a second right IMU. A logic machine is configured to assess an alignment of the head-mounted display system based at least in part on the orientation of the left display assembly, the orientation of the right display assembly, the left-side orientation of the head-tracking system, and the right-side orientation of the head-tracking system.

BRIEF DESCRIPTION OF THE DRAWINGS

FIG. 5 illustrates an example method for display system alignment assessment.

FIG. 10 illustrates an example method for alignment assessment for a head-mounted display system.

DETAILED DESCRIPTION

Figure 1:
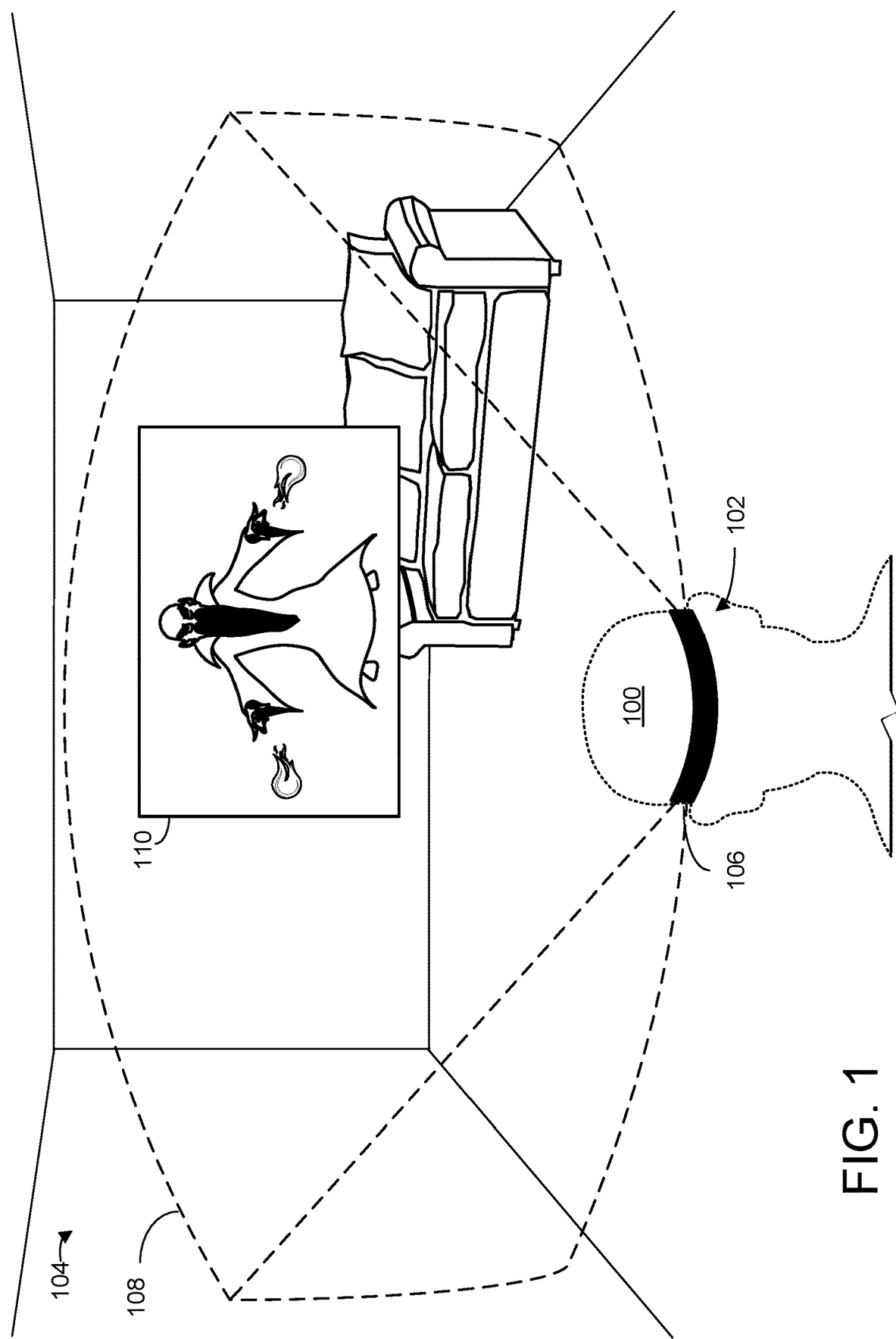
FIG. 1 schematically illustrates use of an example head-mounted display system.

A head-mounted display system may present computer-rendered images to the eyes of a human user via separate near-eye displays, one for each eye. However, misalignments between the near-eye displays, between each display and its associated image-forming componentry, between the two display images presented by the two near-eye displays, and/or between various other components of a head-mounted display system, can disrupt the viewing experience in undesirable ways. In some cases, such misalignments can cause feelings of discomfort or sickness for the user, such as disorientation, nausea, or headaches.

As used herein, a "misalignment" refers to any scenario where one component of a head-mounted display system is out of alignment (e.g., via rotation and/or translation) with one or more other components integrated into or interfacing with the head-mounted display system. A "stereo misalignment" generally refers to any scenario where the display image presented by one near-eye display is out of stereo alignment with the display image presented by the other near-eye display. This can occur due to extrinsic factors, generally referring to scenarios where portions of the head-mounted display system fall out of alignment with one another by bending, flexing, or otherwise moving—e.g., due to application of external forces. Additionally, or alternatively, stereo misalignments can occur due to intrinsic factors affecting the image-forming componentry for one or both near-eye displays—e.g., changes in ambient temperature and/or gradual wear-and-tear can affect performance of the imaging optics. In other words, intrinsic factors can cause the display image presented by one near-eye display to be misaligned with the display image presented by the other near-eye display, even if the displays themselves are still aligned with one another.

Accordingly, the present disclosure is directed to systems for a head-mounted display system that enable detection of misalignments. Specifically, according to the present disclosure, a head-mounted display system may include left and right display assemblies configured to provide respective left- and right-side display light for viewing at respective left and right eyeboxes, via left and right waveguides. An "eyebox" refers to a region of space where display light provided by a display assembly is viewable by a user eye as a display image across the full range of user gaze angles. The left and right display assemblies may further provide respective left- and right-side test light, which is measured by respective left and right optical sensors to assess potential misalignments between each display assembly and its corresponding waveguide. The stereo alignment of the left and right display assemblies relative to one another can be assessed based on the output of respective left and right inertial measurement units (IMUs) configured to measure the orientations of the display assemblies. Based at least in part on measurements from the left and right optical sensors, and/or measurements from the left and right IMUs, a logic machine of the head-mounted display system may assess the stereo alignment for the left- and right-side display light. In some cases, the logic machine performs one or more operations to improve the stereo alignment—e.g., by adjusting one or both of the left- and right-side display light to undo the detected misalignment in image space.

Additionally, or alternatively, a head-mounted display system as described herein may detect potential misalignments based at least in part on the output of more than two IMUs. For example, in addition to the left and right IMUs configured to measure the orientations of the display assemblies, the head-mounted display system may include or interface with second left- and right-side IMUs, and assess an alignment of the head-mounted display system based on measurements collected by the four IMUs together.

The second left- and right-side IMUs may in some cases be configured to measure the orientation of the left and right waveguides of the head-mounted display system—e.g., the first left IMU may be coupled to the left display assembly, while the second left IMU is coupled to the left waveguide, and the logic machine may assess an alignment between the left display assembly and left waveguide based on output from the two left IMUs. A similar arrangement may be used for the right-side display assembly and waveguide. In this manner, the logic machine may assess the alignment for the head-mounted display system based at least in part on the orientation of the left display assembly, the orientation of the left waveguide, the orientation of the right display assembly, and the orientation of the right waveguide, as measured by the first and second left IMUs, and the first and second right IMUs.

As another example, the head-mounted display system may include or interface with a head-tracking system, and the second left- and right-side IMUs may be integrated into the head-tracking system. For example, the head-tracking system may be implemented as a separate accessory that is removably attachable to a wearable frame assembly of the head-mounted display system, where the head-tracking accessory includes the second left IMU and the second right IMU. In some cases, the second left- and right-side IMUs may be distributed between two or more different head-tracking systems—e.g., a left-side head-tracking system and a right-side head-tracking system—which may each be removably attachable to the wearable frame assembly as separate accessories. As another example, the head-tracking componentry may be integrated into the wearable frame assembly of the head-mounted display device—e.g., one or more head-tracking sensors and IMUs may be integrated into the wearable frame assembly, rather than a separate head-tracking accessory.

It will be understood that, in cases where the head-mounted display system includes or interfaces with a head-tracking system, the head-mounted display system may or may not still include second left- and right-side IMUs configured to measure the orientations of the left and right waveguides. In other words, the logic machine may in some cases receive measurements from a left-side IMU that measures the orientation of the left display assembly, a left-side IMU that measures the orientation of the left waveguide, a left-side IMU that measures a left-side orientation of a head-tracking system, etc. It will be understood that a head-mounted display system as described herein may include any suitable number and arrangement of IMUs, and may assess potential stereo misalignments of the left- and right-side display light based on the output of any or all of such IMUs. Furthermore, it will be understood that in cases where a head-mounted display system includes more than two IMUs (e.g., including IMUs configured to measure the orientation of waveguides and/or a head-tracking system), the head-mounted display system may include or omit optical sensors configured to detect test light emitted by the display assemblies, as discussed above.

The structures and techniques described herein may beneficially enable detection of misalignments of a head-mounted display system in a manner that is simpler, easier to manufacture, and more cost-effective than conventional approaches, which often make use of a relatively large and complex optical combiner positioned at or near a nose bridge of the head-mounted display system. Furthermore, it is believed that the herein disclosed structures and corresponding techniques allow for an HMD with a more desirable form factor because there is no need for an optical combiner at the conspicuous position in the middle of the user's face. Furthermore, the structures and techniques described herein may in some cases enable detection of misalignments regardless of whether they are caused by extrinsic and/or intrinsic factors—e.g., as any intrinsic factors affecting the display light provided by a given display assembly may also affect test light provided by the same display assembly.

FIG. 1 schematically illustrates use of a head-mounted display system. Specifically, FIG. 1 schematically depicts a user 100 wearing a head-mounted display system 102 and viewing a surrounding real-world environment 104. Head-mounted display system 102 includes one or more near-eye displays 106 configured to present computer-generated imagery to eyes of the user, as will be described below. FIG. 1 also shows a field of view (FOV) 108 indicating an area in which the near-eye displays can present virtual imagery that will be visible to the user.

Head-mounted display system 102 may be used to view and interact with computer-rendered virtual imagery. In the example of FIG. 1, the head-mounted display system is presenting a virtual image 110, taking the form of a virtual wizard character that is not present in the user's real-world environment. Such virtual imagery may be displayed as a series of digital image frames presented via the near-eye displays that dynamically update over time—e.g., based on changes in an underlying software application, and/or as a position/orientation of the head-mounted display system changes.

Virtual imagery presented by the head-mounted display system may be rendered by any suitable computer logic componentry. Such logic componentry may be on-board, and/or at least some rendering of virtual imagery may be outsourced to an off-board computing device—e.g., collocated in a same real-world environment as the head-mounted display system, or streamed over a suitable computer network. In general, the computer logic componentry that renders the virtual imagery may have any suitable capabilities, hardware configuration, and form factor. In some cases, such logic componentry may be implemented as a logic machine as described below with respect to FIG. 15. The head-mounted display system may in some cases be implemented as computing system 1500 shown in FIG. 15.

Head-mounted display system 102 may be an augmented reality computing device that allows user 100 to directly view real world environment 104 through near-eye displays that are at least partially transparent. Alternatively, the near-eye displays may be fully opaque and either present imagery of a real-world environment as captured by a front-facing camera, or present a fully virtual surrounding environment while blocking the user's view of the real world. To avoid repetition, experiences provided by both implementations are referred to as "virtual reality," and the computing devices used to provide the augmented or purely virtualized experiences are referred to as head-mounted display systems.

As discussed above, the head-mounted display system may present virtual imagery via two near-eye displays, one for each user eye. By presenting left and right images at respective left and right near-eye displays, the head-mounted display system may create the impression in the user's brain that the two images correspond to a single three-dimensional virtual object. By controlling the sizes and positions of the left and right display images, the head-mounted display system may control the world-space position that the virtual object appears to occupy (e.g., the object's apparent three-dimensional position relative to the user).

Figure 2B:
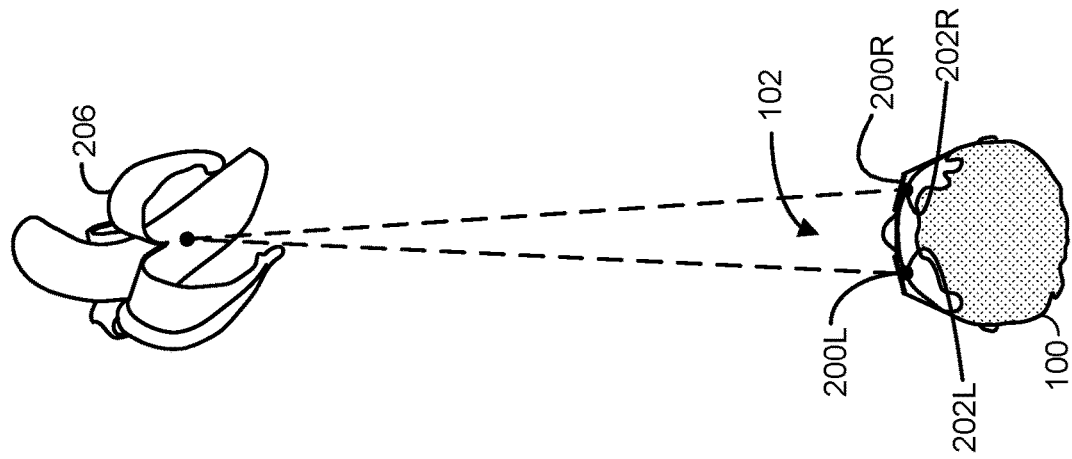
FIGS. 2A and 2B schematically illustrate presentation of virtual imagery to user eyes via a head-mounted display system.
Figure 2A:
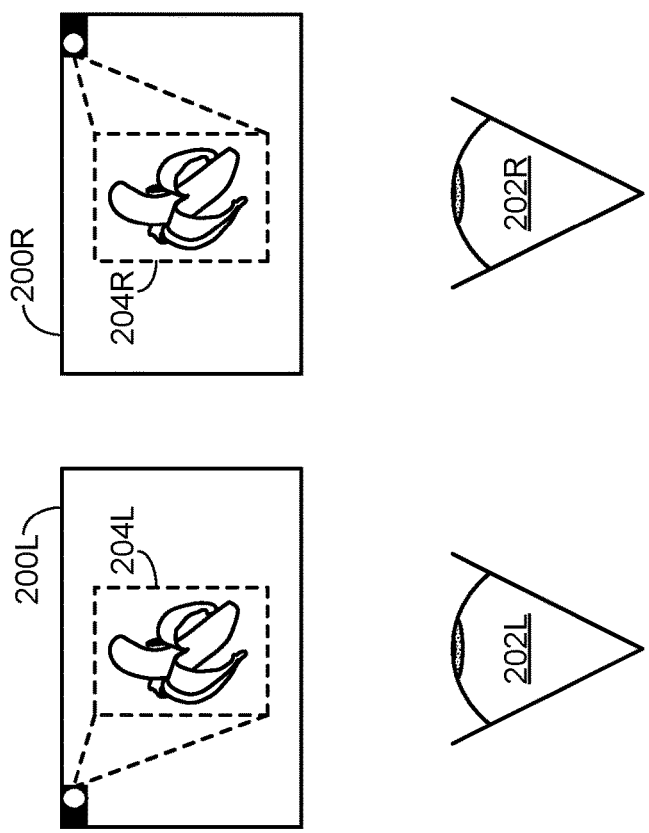

This is schematically illustrated with respect to FIGS. 2A and 2B, which shows two near-eye displays 200L and 200R of a head-mounted display system. Other components of the head-mounted display system are omitted for simplicity's sake. As shown, left near-eye display 200L is positioned in front of a left user eye 202L, and presents a left display image 204L for viewing by the left user eye. Right near-eye display 200R is positioned in front of a right user eye 202R and presents a right display image 204R for viewing by the right user eye. In this nonlimiting example, the display images correspond to a banana.

FIG. 2B schematically shows an overhead view of user 100, with near-eye displays 200L and 200R still positioned in front of user eyes 202L and 202R. FIG. 2B additionally shows a virtual object 206 having an apparent world-space position that is spaced in front of the user. In other words, FIG. 2B illustrates how the user's brain interprets left image 204L and right image 204R as a single three-dimensional virtual object 206.

Figure 3B:
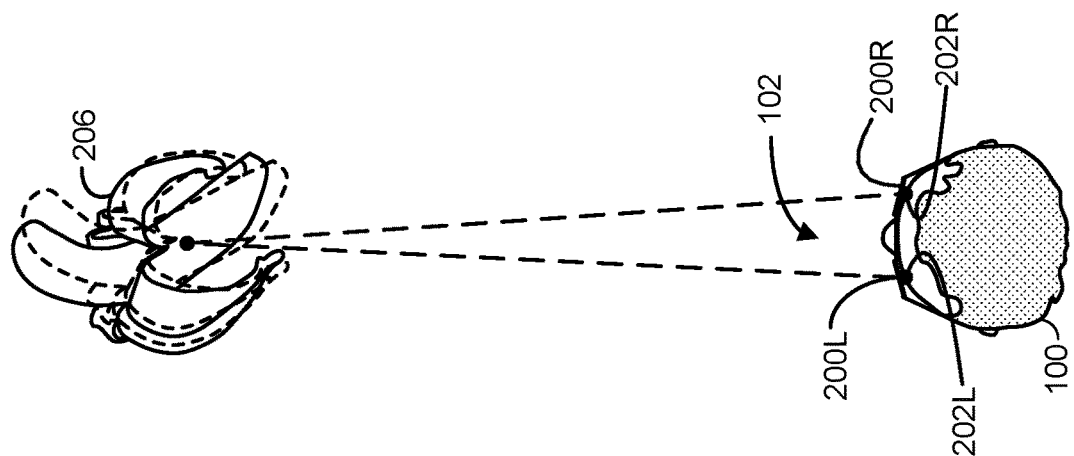
FIGS. 3A and 3B schematically illustrate one example of stereo misalignment affecting a head-mounted display system.
Figure 3A:
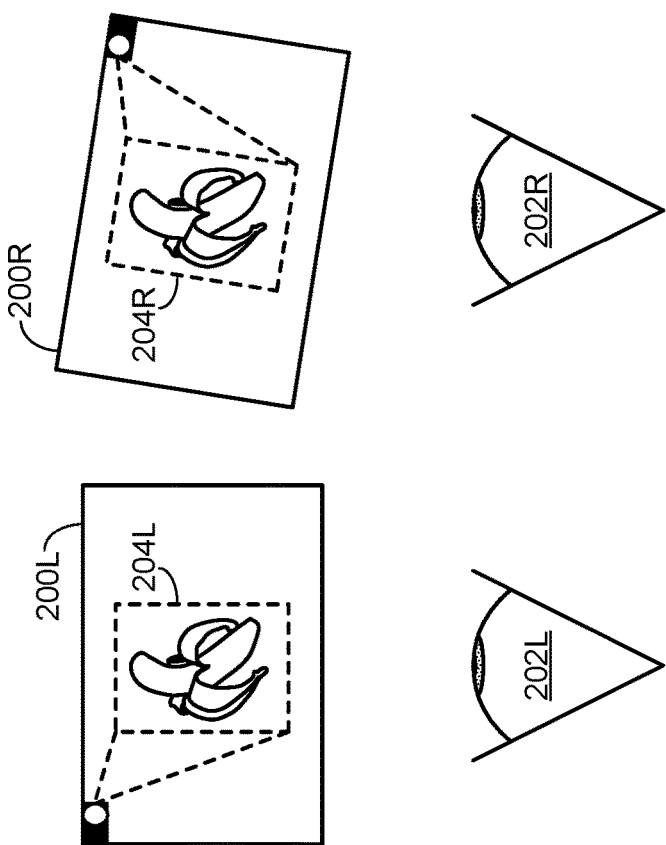

However, as discussed above, misalignments in the head-mounted display system can interfere with the viewing experience, potentially causing discomfort or even feelings of sickness for the user. FIGS. 3A and 3B schematically illustrate a scenario where components of the head-mounted display system are misaligned. Specifically, FIG. 3A again schematically depicts near-eye displays 200L and 200R positioned in front of user eyes 202L and 202R while presenting display images 204L and 204R. However, in this example, right near-eye display 200R is misaligned relative to left near-eye display 200L— specifically, the right near-eye display is offset by approximately 10°. As such, in FIG. 3B, the two display images do not resolve to a single three-dimensional object 206, but rather are perceived as two different offset images. This can be distracting at best, and at worst, can cause discomfort and feelings of sickness for the user.

As discussed above, stereo misalignments may occur for a wide variety of reasons. For instance, the scenario depicted in FIG. 3A can occur when an external force is applied to the head-mounted display system, causing parts of the system (e.g., the right near-eye display) to bend or flex relative to other parts of the system. In general, however, any combination of extrinsic and/or intrinsic factors can interfere with the alignment of one display image relative to the other, potentially detracting from the virtual experience provided to the user.

Figure 4:
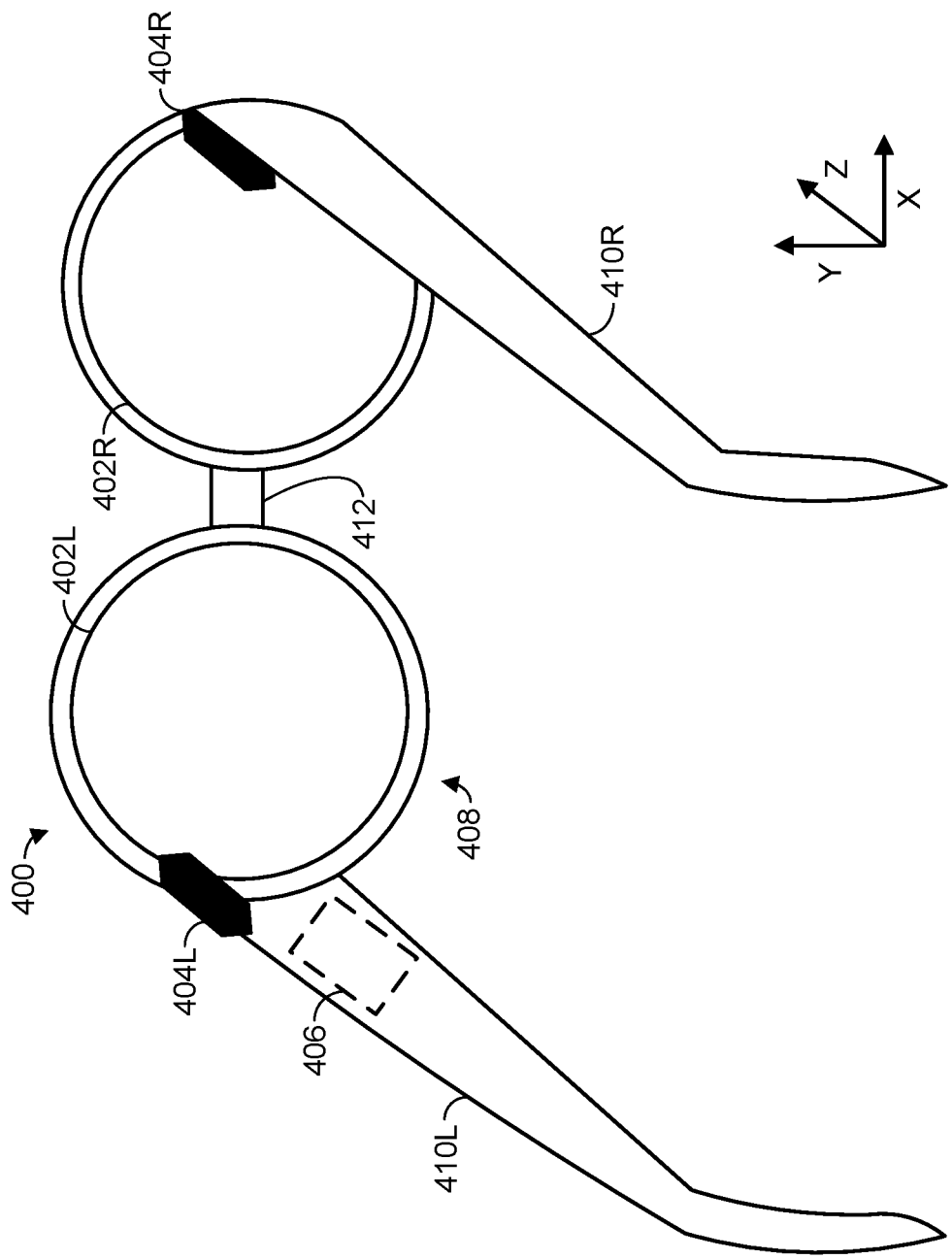
FIG. 4 schematically shows an example head-mounted display system.

Accordingly, FIG. 4 schematically illustrates an example head-mounted display system 400, including structures useable to assess the current stereo alignment of the left and right display light used to present virtual images to a user's eyes. It will be understood that the specific appearance and physical configuration of head-mounted display system 400 are greatly simplified for ease of understanding and are in no way limiting. In general, the techniques and structures described herein may be used with a wide variety of different suitable devices, which may differ from head-mounted display system 400 in any number of suitable ways.

As shown, head-mounted display system 400 includes a left waveguide 402L and a left display assembly 404L. A waveguide and its corresponding display assembly may together constitute a near-eye display as described above— e.g., left waveguide 402L and left display assembly 404L together constitute a left near-eye display. The left display assembly is configured to provide left-side display light, and may additionally provide left-side test light. As will be described in more detail below, the left-side display light may form a left display image for viewing by a user's left eye at an eyebox of the left waveguide. The left-side test light may be measured by a left optical sensor to assess a potential misalignment between the left display assembly and left waveguide. As used herein, a "potential misalignment" can refer to an angular change of one component relative to another (e.g., by rotating relative to one or more orthogonal axes), and/or a translational offset of one component relative to another (e.g., by translating relative to one or more orthogonal axes). The head-mounted display system further includes a right waveguide 402R and a right display assembly 404R configured to provide right-side display light and right-side test light.

In the example of FIG. 4, the left and right waveguides are generally circular in shape. It will be understood that this is a non-limiting example. In general, each waveguide may have any suitable regular or irregular shape, provided that they are each useable for delivering display light from a display assembly to an eyebox for viewing by a user eye. Furthermore, the left and right waveguides need not each have the same shape.

As will be described in more detail below, each display assembly may provide display light that is incoupled by its corresponding waveguide, and outcoupled by the waveguide for viewing by a user eye at an eyebox. The left- and right-side display light provided by the left and right display assemblies may form respective left and right display images, as discussed above. Each display assembly may use any suitable image-forming technology for controlling emission of display light, such that the display light forms the display image at the waveguide. In one example, the left display assembly and/or the right display include liquid crystal on silicon (LCOS) displays, where light from a light source is polarized and reflected off a plurality of pixels of a dynamically controllable liquid crystal layer. In another example, the left display assembly and/or the right display assembly include microoptoelectromechanical system (MO-EMS) projector displays, where light from a light source is reflected off one or more micromirrors. In another example, the left display assembly and/or the right display assembly may include micro light-emitting diode (μLED) displays or dot matrix displays.

Regardless of the specific image-forming technology used by the display assemblies, operation of the display assemblies to provide spatially modulated display light for forming display images may be controlled by a logic machine, such as logic machine 406 schematically shown in FIG. 4. The logic machine may additionally, or alternatively, detect misalignments between various components of the head-mounted display system. For example, as will be described in more detail below, the logic machine may be configured to assess a stereo alignment for the left- and right-side display light provided by respective left and right display assemblies. This may be done based at least in part on analysis of A) left- and right-side test light measured by left and right optical sensors, and B) the orientations of the left and right display assemblies measured by left and right IMUs. Additionally, or alternatively, the alignment may be assessed based at least in part on the output of more than two IMUs, as will be described in more detail below.

It will be understood that the specific position of the logic machine with respect to the rest of head-mounted display system 400 is not limiting, and is used only for the sake of example. The logic machine may take the form of any suitable computer logic componentry, such as a suitable processor or application-specific integrated circuit (ASIC). In some cases, the logic machine may render images for presentation by the near-eye displays, and send control inputs to the respective display assemblies that cause the display assemblies to provide corresponding display light. In other examples, some to all rendering of display images may be performed by a separate logic component (e.g., on-board or off-board the head-mounted display system). In some examples, logic machine 406 may be implemented as described below with respect to FIG. 15.

In the example of FIG. 4, the head-mounted display assembly includes a wearable frame assembly 408, including circular frames surrounding left waveguide 402L and right waveguide 402R, a left temple support 410L, a right temple support 410R, and a bridge support 412. Left waveguide 402L and left display assembly 404L are each mounted to a left side of the wearable frame assembly (e.g., left of bridge support 412), while right waveguide 402R and right display assembly 404R are mounted to a right side of the wearable frame assembly (e.g., right of bridge support 412). More particularly, in this example, left display assembly 404L is coupled to left temple support 410L, while right display assembly 404R is coupled to right temple support 410R. Notably, in the illustrated example, the two display assemblies (as well as corresponding optical sensors that will be described below) are positioned distal from bridge support 412.

In this example, the wearable frame assembly is similar to the frame of a conventional pair of eyeglasses—e.g., two separate temple supports that, when worn, support the head-mounted display system through contact with the user's temples and/or ears. However, as discussed above, it will be understood that the specific configuration of head-mounted display system 400 shown in FIG. 4 is non-limiting and serves as only one simplified example. In other examples, the wearable frame assembly may take other suitable forms—e.g., the wearable frame assembly may include a headband that wraps around the wearer's head, rather than two separate temple supports, or the wearable frame assembly may include a helmet supporting a display with a visor form factor.

As indicated above, various structures of head-mounted display system 400 are useable to detect stereo misalignment between the left and right display light used to present virtual images to a user's eyes. Accordingly, FIG. 5 illustrates an example method 500 for display system alignment assessment. Steps of method 500 may be performed by any suitable device, having any suitable capabilities, hardware configuration, and form factor. In some examples, method 500 may be implemented by head-mounted display systems 102, 400, and/or any other head-mounted display systems described herein. In some examples, steps of method 500 may be performed by computing system 1500 described below with respect to FIG. 15.

Although steps of method 500 are described in sequence, it will be understood that the steps need not be carried out sequentially. Rather, one or more steps of method 500 may be performed in parallel. In some cases, method 500 may be repeated or looped upon completion. In some cases, method 500 may be run periodically (e.g., at a predetermined frequency), and/or run in response to one or more designated triggers—e.g., based on an on-board strain sensor of the head-mounted display system detecting strain.

Figure 6:
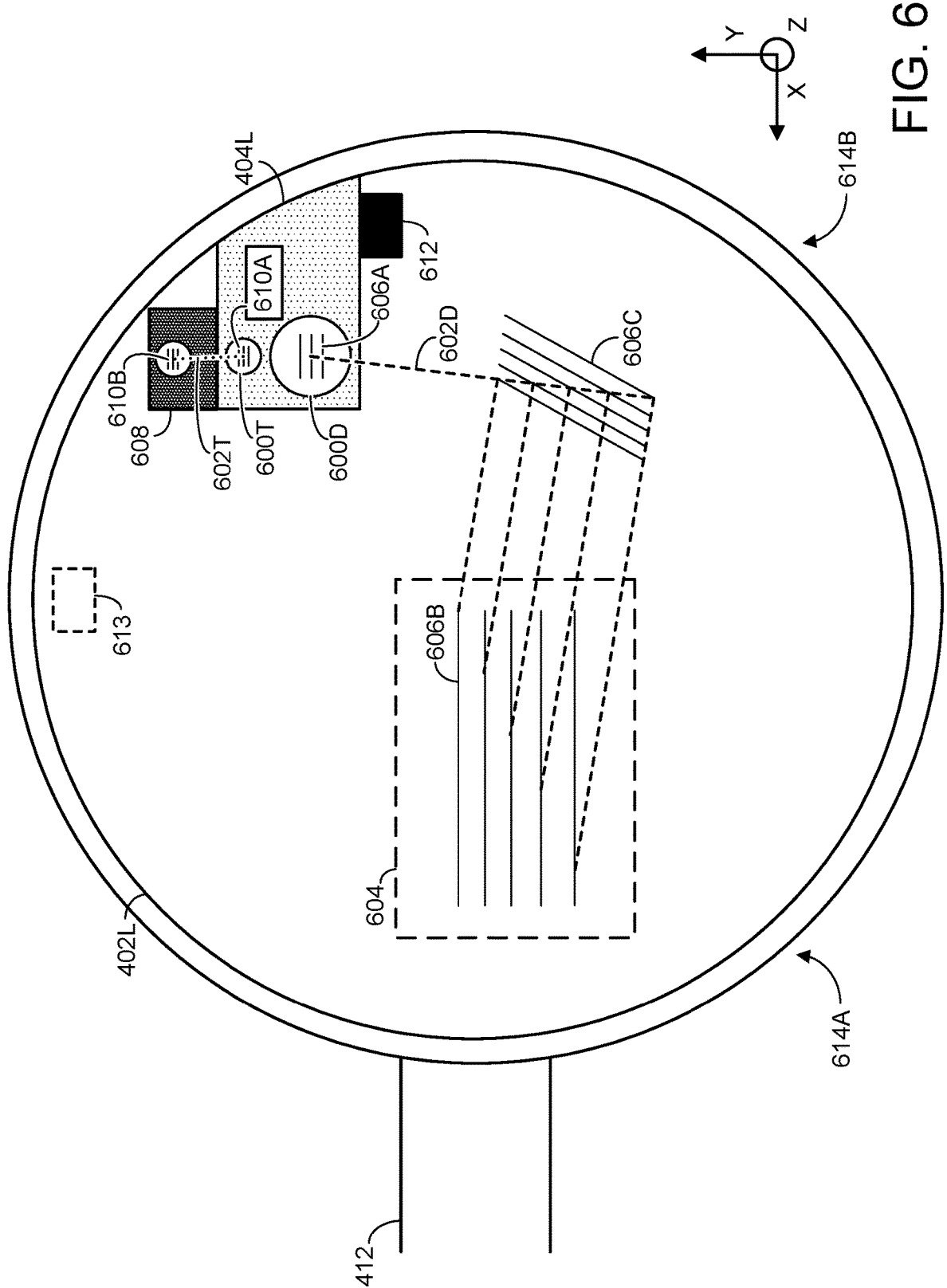
FIG. 6 schematically shows an example left waveguide and left display assembly of a head-mounted display system.

At 502, method 500 includes, at a left display assembly of a head-mounted display system, emitting left-side display light and left-side test light, the left-side display light incoupled by a left waveguide and outcoupled for viewing at a left eyebox. This is illustrated with respect to FIG. 6, which schematically shows left waveguide 402L and associated components of head-mounted display system 400 in more detail. Specifically, FIG. 6 schematically depicts left waveguide 402L and left display assembly 404L. Bridge support 412 is shown extending away from the left waveguide and toward the right waveguide.

In FIG. 6, left display assembly 404L includes a first left pupil 600D for releasing left-side display light 602D. The left display assembly further includes a second left pupil 600T for releasing left-side test light 602T. In other examples, the left display assembly can include a shared left pupil for releasing both the left-side display light and the left-side test light. One example of a display assembly including a shared pupil will be described below with respect to FIG. 7.

Left waveguide 402L is configured to incouple the left-side display light from the left display assembly and outcouple the left-side display light for viewing at a left eyebox 604. It will be understood that the size and position of the left eyebox relative to left waveguide 402L and other components depicted in FIG. 6 is non-limiting. In some examples, incoupling and outcoupling of the left display light is facilitated by suitable diffractive optical elements (DOEs) on left waveguide 402L. In FIG. 6, left waveguide 402L includes a first left-side DOE (L-DOE-I) 606A for incoupling left display light 602D, and a second left-side DOE (L-DOE-O) 606B for outcoupling the left-side display light for viewing at the left eyebox, represented in FIG. 6 by different sets of parallel lines on the surface of the waveguide.

A diffractive optical element as described herein may take any suitable form. As one example, a DOE can include a plurality of surface relief gratings etched onto the surface of the waveguide. As light strikes the surface relief gratings, at least some of the light is refracted into or out of the waveguide, depending on the purpose of the grating. In other examples, the DOEs may take other suitable forms. For example, the DOEs can include holographic optical elements (HOEs).

Once incoupled, light may propagate within the waveguide in any suitable way. As one example, light may propagate through a waveguide via total internal reflection, where light repeatedly reflects between opposite surfaces of the waveguide until the light is outcoupled by a different DOE.

In some cases, the waveguide may include one or more additional DOEs or other optical features between the incoupling DOE and the outcoupling DOE, such as one or more left-side expansion DOEs for expanding the left-side display light along one or more orthogonal dimensions. In the example of FIG. 6, left waveguide 402L includes a left-side expansion DOE (L-DOE-X) 606C along the optical path between L-DOE-I 606A and L-DOE-O 606B. L-DOE-X 606C functions to expand the display light 602D relative to the Y axis. It will be understood that a waveguide as described herein may include any suitable number of DOEs disposed along the optical path of the display light, which may condition or affect the display light in any suitable way (e.g., expand along the Y axis and/or the X axis to increase a size of the eyebox).

Left-side display assembly 404L further provides left-side test light 602T. In some cases, the display light and test light may originate from separate light sources within the display assembly, for release by separate pupils of the display assembly. In such cases, properties of the test light may vary from the display light in any suitable way. For example, while the display light may often be spatially modulated to form a display image, the test light may be substantially monochromatic—e.g., using relatively few different wavelengths, such as only one. In some cases, a brightness of the test light may differ from the display light—e.g., the test light may be less bright than the display light, as it is intended only for measurement by the optical sensor and not for viewing by a user eye. In some cases, the test light may use non-visible wavelengths of light—e.g., the test light may include infrared light. In other examples, the test light and display light may originate from the same light source and have substantially similar properties, although may be released along different optical paths by the different pupils of the display assembly.

As will be described in more detail below, the head-mounted display system further includes a left optical sensor 608 positioned to measure the left-side test light. In this manner, a logic machine of the head-mounted display assembly may assess a potential misalignment between the left display assembly and the left waveguide—e.g., to detect a stereo misalignment between the left and right display images. In the example of FIG. 6, the left waveguide 402L is configured to incouple the left-side test light and outcouple the left-side test light for sensing by the left optical sensor. This is achieved via test-light DOE 610A, which incouples the test light to the waveguide, and test-light DOE 610B, which outcouples the test light for measurement by the left optical sensor. In other examples, the test light need not be incoupled or outcoupled by the waveguide. Rather, the test light may be released from the display assembly and reflect off a surface of the waveguide en route to the optical sensor.

Furthermore, in the example of FIG. 6, the left optical sensor 608 is coupled to the left display assembly. Because the left test light propagates through the waveguide, a misalignment between the left display assembly and the waveguide may affect the angle and/or position at which the left-side test light is received at the left optical sensor, as will be described in more detail below. In other examples, one or both optical sensors may be coupled to their corresponding waveguide, rather than their corresponding display assembly. One example configuration in which an optical sensor is coupled to a waveguide will be described below with respect to FIG. 7. Furthermore, in FIG. 6, both the display assembly and optical sensor are disposed along the surface of the waveguide closer to the user eye—e.g., the display assembly and optical sensor are visible through the waveguide in FIG. 6. In other examples, either or both of the display assembly and optical sensor may be disposed along the surface of the waveguide opposite from the user eye.

In the example of FIG. 6, the head-mounted display system further includes a left IMU 612. The left IMU is configured to measure an orientation of the left display assembly. In some implementations, the left/right IMUs include one or more accelerometers, one or more gyroscopes, a magnetometer, and/or an optical sensor to assess orientation from optical flow. In some implementations, the left/right IMUs measure orientation with six degrees of freedom (6DOF). As will be described in more detail below, measurements from the left IMU may be compared to measurements from a right IMU corresponding to a right display assembly. In this manner, the logic machine of the head-mounted display system can assess the relative orientations and/or positions of the left display assembly and the right display assembly—e.g., to detect a misalignment between the two display assemblies. In FIG. 6, the left IMU is physically coupled to the left display assembly. In this manner, the left IMU can directly measure changes in orientation and/or position of the left display assembly.

In some cases, the head-mounted display system may include a second left IMU configured to measure an orientation of the left waveguide. In FIG. 6, a second left IMU 613 is configured to measure an orientation of the left waveguide. IMU 613 is shown in dashed lines to indicate that a head-mounted display system need not always include a second left IMU.

It will be understood that the specific position of second left IMU 613 with respect to waveguide 402L and other components shown in FIG. 6 is non-limiting. As will be described in more detail below, the head-mounted display system may in some cases include a left-side IMU configured to assess an orientation of a head-tracking system, in addition to or instead of a left-side IMU configured to measure the orientation of the left waveguide. In cases where a second left IMU is used, the head-mounted display system may in some cases omit the left optical sensor, and the display assembly may only provide display light, rather than display light and test light.

Notably, as discussed above, the left display assembly and left optical sensor are positioned distal from the bridge support 412 disposed between the left and right waveguides. In other words, as shown in FIG. 6, the left waveguide has a left inner portion 614A proximate to the right waveguide, and a left outer portion 614B distal from the right waveguide. The left optical sensor is disposed proximate to the left outer portion of the left waveguide—e.g., the left optical sensor is closer to a left temple region of the head-mounted display system than to the bridge support. As used herein, the left inner portion and left outer portion may each refer to any suitable area of the waveguide—e.g., the left inner portion may refer to an inner half of the waveguide, while the outer portion refers to an outer half of the waveguide.

Returning briefly to FIG. 5, at 504, method 500 includes, at a right display assembly of the head-mounted display system, emitting right-side display light and right-side test light, the right-side display light incoupled by a right waveguide and outcoupled for viewing at a right eyebox. In one example, this is done substantially as described above with respect to FIG. 6, albeit with a right waveguide, right display assembly, and other corresponding components, oriented symmetrically to the left waveguide and corresponding components.

Figure 7:
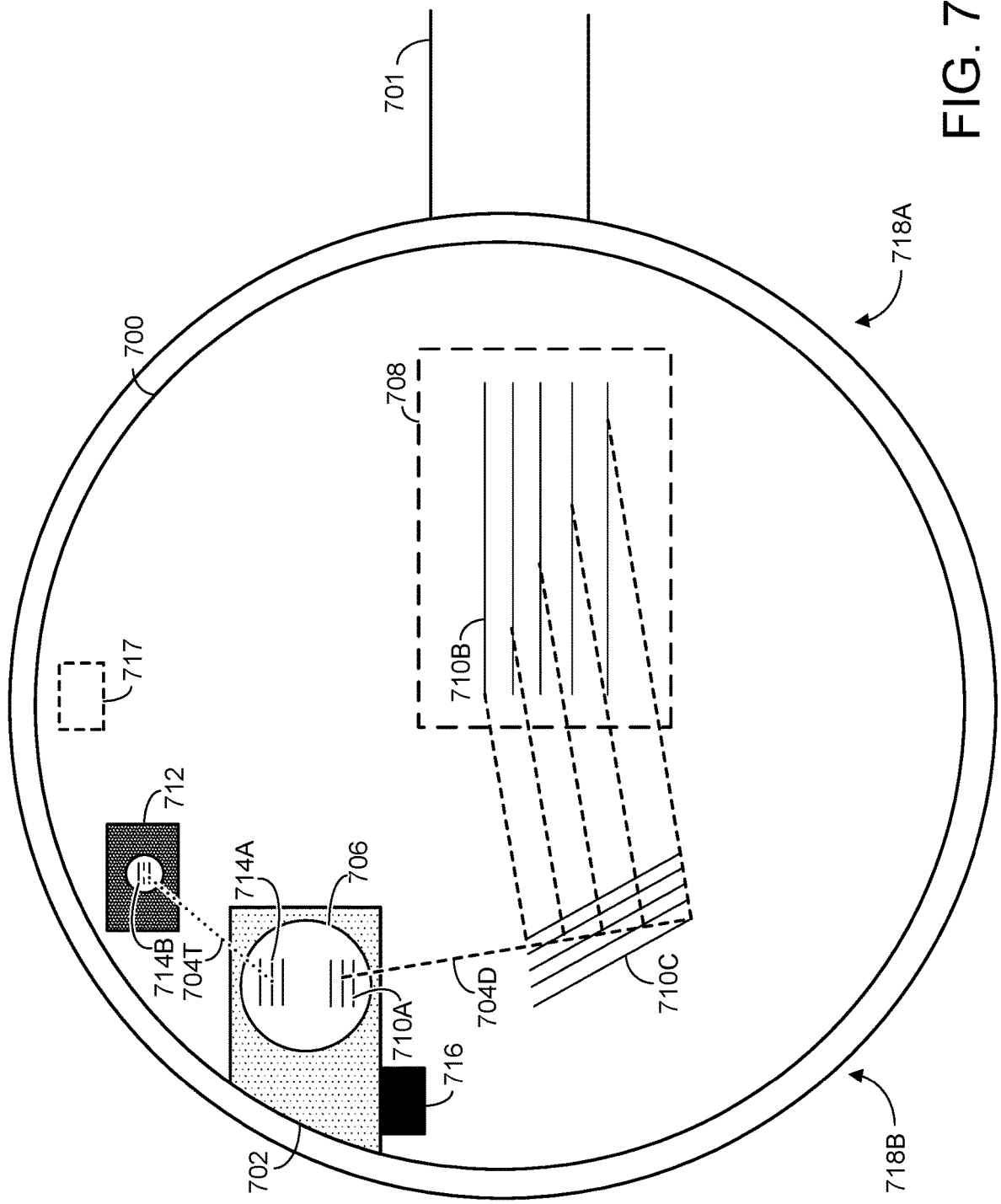
FIG. 7 schematically shows an example right waveguide and right display assembly of a head-mounted display system.

However, the arrangement of components schematically depicted in FIG. 6 is only one non-limiting example. Thus, step 504 of method 500 is described in more detail with respect to FIG. 7, schematically showing an alternate right waveguide 700 with corresponding display components having a configuration that varies from that shown in FIG. 6. A bridge support 701 is shown extending away from the right waveguide and toward the left waveguide. As with FIG. 6, it will be understood that the configuration shown in FIG. 7 is another non-limiting example, and that a head-mounted display system as described herein need not use the exact configurations shown in either FIG. 6 or FIG. 7.

In some examples, a head-mounted display device may include two near-eye displays with substantially similar configurations, albeit oriented symmetrically from one another. In other examples, a head-mounted display system may include near-eye displays with different configurations—e.g., one near-eye display may use a configuration similar to that of FIG. 6, while the other near-eye display uses a configuration similar to that of FIG. 7.

In FIG. 7, the head-mounted display system includes a right display assembly 702 configured to provide right-side display light 704D and right-side test light 704T. Unlike left display assembly 404L, right display assembly 702 includes a shared pupil 706 for releasing the right-side display light and the right-side test light. However, as discussed above, a right display assembly may alternatively include a first right pupil for releasing the right-side display light, and a second right pupil for releasing the right-side test light. In this example, the display assembly is disposed along a surface of the waveguide closer to the user eye. In other examples, the display assembly may be disposed along the opposite surface of the waveguide from the user eye.

In cases where a shared pupil is used, the test light may in some cases be a subset of the display light. In other words, both the display light and test light may in some cases originate from the same light source within the display assembly. In the example of FIG. 7, separate DOEs are used for incoupling the display light and test light to the waveguide, although this need not always be the case. In some examples, the display assembly may provide more display light than is needed to form a display image, and the extra display light may be measured by the optical sensor as test light. In some cases, the test light may include residual display light that is not outcoupled by the waveguide at the eyebox. In some cases, the display light may be released with some non-visible wavelengths, and the non-visible wavelengths may be measured as test light—e.g., the test light can include infrared light. As another example, when a shared pupil is used, the display light and test light can be separated temporally—e.g., on some time frames, display light may be released for viewing by a user eye, while on other time frames, test light is released for measurement by the optical sensor.

Similar to left waveguide 402L, right waveguide 700 is configured to incouple the right-side display light from the right display assembly, and outcouple the right-side display light for viewing at a right eyebox 708. This may be achieved via suitable DOEs as described above—waveguide 700 includes a first right-side DOE (R-DOE-I) 710A that incouples display light 704D to the waveguide, and a second right-side DOE (R-DOE-O) 710B that outcouples the display light for viewing at eyebox 708. The right waveguide may further include one or more right-side expansion DOEs along the optical path between the R-DOE-I and the R-DOE-O for expanding the right-side display light along one or more orthogonal dimensions. In the example of FIG. 7, right waveguide 700 includes an expansion DOE (R-DOE-X) 710C that expands the display light along the Y axis.

In FIG. 7, the head-mounted display system further includes a right optical sensor 712 positioned to measure the right-side test light. However, unlike left optical sensor 608, right optical sensor 712 is coupled to the right waveguide, rather than coupled to the right display assembly. It will be understood that the specific position of optical sensor 712 relative to waveguide 700 shown in FIG. 7 is non-limiting. In another example, the image sensor may be positioned along the optical path of the display light released from the shared pupil, such that some display light (e.g., residual light, non-visible light) can be measured as test light.

The right optical sensor may be coupled to either side of the waveguide—e.g., to the side of the waveguide closer to the user eye, or the opposite side of the waveguide from the user eye. Alternatively, as described above, the right optical sensor may be coupled to the right display assembly, similar to left optical sensor 608. In any case, as with the right-side display light, the right waveguide 700 may be configured to incouple the right-side test light 704T, and outcouple the right-side test light for sensing by right optical sensor 712. In the example of FIG. 7, this is achieved via an incoupling DOE 714A and an outcoupling DOE 714B. Alternately, as discussed above, the test light may be reflected off a surface of the waveguide, without being incoupled.

In FIG. 7, the head-mounted display system further includes a right IMU 716 configured to measure an orientation of the right display assembly. As will be described in more detail below, output from the right IMU may be compared to output from a left IMU (e.g., left IMU 612) to assess a potential misalignment between one display assembly and the other. To this end, in FIG. 7, the right IMU is physically coupled to the right display assembly. Thus, as a position and/or orientation of the right display assembly changes (e.g., due to application of an external force), this change may be detected by the right IMU.

Furthermore, the head-mounted display system may in some cases include a second right IMU. FIG. 7 schematically shows a second right IMU 717 configured to measure an orientation of the right waveguide. IMU 717 is shown in dashed lines to indicate that a head-mounted display system need not include a second right IMU. In cases where the head-mounted display system includes a second right IMU, the optical sensor may optionally be emitted, and the display assembly may provide only display light, rather than both display and test light.

Notably, as discussed above, the right display assembly and right optical sensor are positioned distal from the bridge support 701 disposed between the left and right waveguides. In other words, as shown in FIG. 7, the right waveguide has a right inner portion 718A proximate to the left waveguide, and a right outer portion 718B distal from the left waveguide. The right optical sensor is disposed proximate to the right outer portion of the right waveguide—e.g., the right optical sensor is closer to a right temple region of the head-mounted display system than to the bridge support. As with FIG. 6, the right inner portion and right outer portion may each refer to any suitable area of the waveguide—e.g., the right inner portion may refer to an inner half of the waveguide, while the outer portion refers to an outer half of the waveguide.

Returning briefly to FIG. 5, at 506, method 500 includes measuring the left-side test light at the left optical sensor proximate to the left display assembly. At 508, the method includes measuring the right-side test light at the right optical sensor proximate to the right display assembly. In other words, as discussed above, each of the left and right display assemblies provide respective left-side and right-side test light, which is measured by respective left and right optical sensors. For example, in FIG. 6, left-side test light 602T is provided by left display assembly 404L and measured by left optical sensor 608. In FIG. 7, right-side display light 704T provided by right display assembly 702 is measured by right optical sensor 712. Any misalignment between a display assembly and its corresponding waveguide that affects the display light provided by the display assembly (e.g., in a manner that causes stereo misalignment between the two display images) will likely also affect measurement of the test light at the optical sensor, enabling a logic machine of the head-mounted display system to detect the misalignment.

Figure 8A:
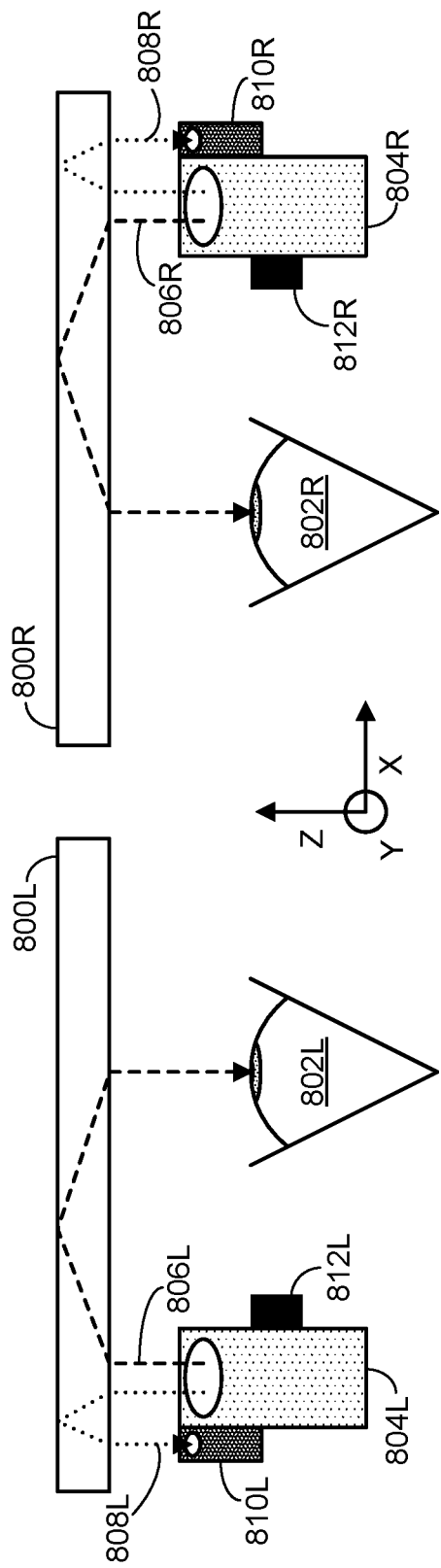
FIGS. 8A-8E schematically illustrate assessing potential misalignments between display assemblies and waveguides of an example head-mounted display system.

Measurement of test light at optical sensors is described in more detail with respect to FIGS. 8A-E. Specifically, FIG. 8A schematically shows an overhead view of two waveguides 800L and 800R of an example head-mounted display system. Waveguides 800L and 800R are positioned in front of respective left and right user eyes 802L and 802R. A left display assembly 804L provides left-side display light 806L and left-side test light 808L, while a right display assembly 804R provides right-side display light 806R and right-side test light 808R. The left-side display light and right-side display light are respectively incoupled by the left and right waveguides, and outcoupled for viewing by the left and right user eyes. The left-side test light and right-side test light are incoupled by the left and right waveguides and outcoupled for measurement by a left optical sensor 810L and a right optical sensor 810R. FIG. 8A additionally shows a left IMU 812L coupled to left display assembly 804L, and a right IMU 812R coupled to right display assembly 804R.

In FIG. 8A, the display assemblies and optical sensors are shown spaced away from their corresponding waveguides. It will be understood that this is done only for the sake of visual clarity, to better illustrate the light paths between the display assemblies, waveguides, user eyes, and optical sensors. In some cases, the display assemblies and/or optical sensors may be closer to the waveguides than is shown in FIG. 8A. For instance, the display assemblies and/or optical sensors may be contacting or coupled to their respective waveguide.

Furthermore, it will be understood that the light paths shown in FIG. 8A corresponding to the left- and right-side display light, as well as the left- and right-side test light, are not intended to be an accurate representation of how light propagates through a waveguide, or between the various components of the head-mounted display system. Rather, FIGS. 8A-8E are intended to illustrate the concept of how light provided by a display assembly can be redirected by a waveguide to a user eye or an optical sensor, and how such redirection can be affected by misalignments between the various components.

Figure 8B:
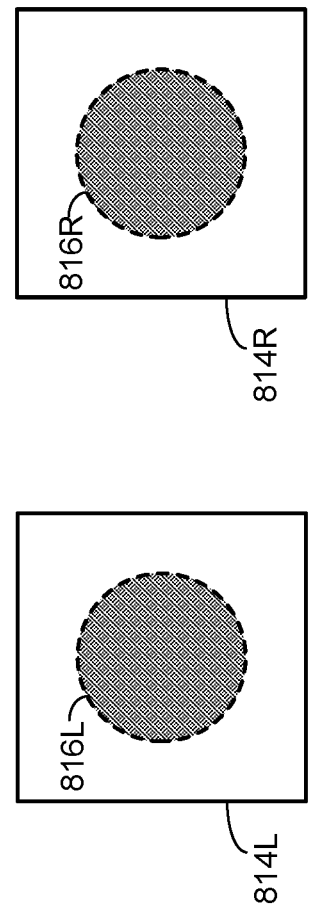

FIG. 8B schematically shows example light sensors 814L of optical sensor 810L, and 814R of optical sensor 810R.

FIG. 8B also shows a light pattern 816L, indicating portions of the left light sensor that are currently detecting left-side test light 808L provided by the left display assembly. Light pattern 816R represents portions of light sensor 814R that are detecting right-side test light 808R. More particularly, the positions of light patterns 816L and 816R relative to the respective light sensors shown in FIG. 8B is consistent with the scenario depicted in FIG. 8A, where the left and right display assemblies are correctly aligned with their corresponding waveguides. In the example of FIG. 8B, the light patterns are each approximately centered relative to the light sensors, which indicates correct alignment. In other examples, correct alignment between the display assembly and optical sensor may be indicated by a different position, size, shape, intensity, and/or polarization of the light pattern. As will be described in more detail below, a detected deviation of the light pattern from what is expected may be indicative of a misalignment between the display assembly and optical sensor, which can cause a stereo misalignment between the left and right display images.

The left and right optical sensors may be implemented as any suitable combination of components useable for sensing incoming test light from a display assembly. In general, an optical sensor will include a light sensor (e.g., one or more photo-sensitive pixels that respond when illuminated by a light source), and some form of aperture for focusing incoming test light on the light sensor. As one example, either or both of the left optical sensor and the right optical sensor may include a pinhole camera (e.g., a left pinhole camera and/or a right pinhole camera). A pinhole camera may be a relatively simple and cost-effective approach, including a light sensor and a relatively small aperture (e.g., on the order of 50 microns). In some examples, the optical efficiency of the optical sensors may be improved by using a relatively larger aperture along with a focusing lens.

Returning briefly to FIG. 5, at 510, method 500 includes assessing a left-side potential misalignment between the left display assembly and the left waveguide, based at least in part on the left-side test light measured by the left optical sensor. As discussed above, a potential misalignment can include either or both of an angular misalignment (e.g., the display assembly rotates relative to one or more orthogonal axes), and/or a translational misalignment (e.g., the position of the display assembly changes relative to one or more orthogonal axes, even if the angle does not change). This is schematically illustrated with respect to FIGS. 8C and 8D. Specifically, FIG. 8C again shows the head-mounted display system components of FIG. 8A, although left display assembly 804L is now misaligned relative to left waveguide 800L, in the form of an angular misalignment of approximately 10°. As shown, this causes a stereo misalignment by affecting the angle of left-side display light 806L entering left user eye 802L. For example, the user may perceive two doubled display images rather than a single virtual object, as is shown in FIG. 3B.

However, because the left optical sensor 810L is coupled to the left display assembly, the angle of the left-side test light entering the left optical sensor is also affected. This is reflected in FIG. 8D, again schematically showing the light sensor 814L and light pattern 816L of left optical sensor 810L, as well as the light sensor 814R and light pattern 816R of optical sensor 810R. As compared to FIG. 8B, the position of light pattern 816L relative to light sensor 814L has shifted, due to the different angle of left-side test light 808L entering the left optical sensor. Because the right display assembly and right waveguide are still correctly aligned, right light pattern 816R is still centered relative to the light sensor.

Figure 8C:
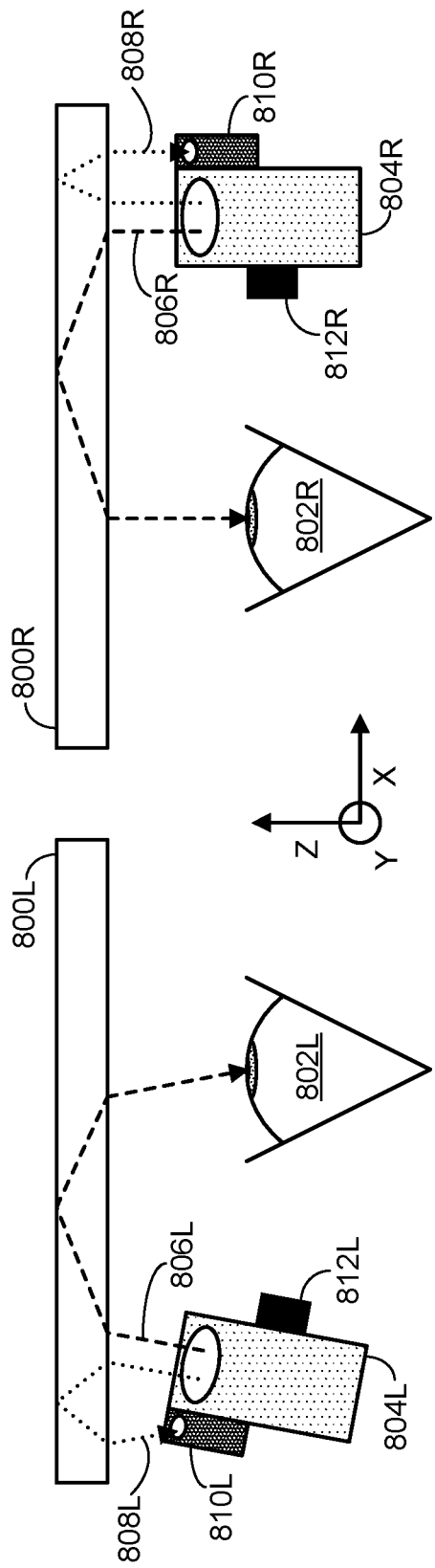
Figure 8D:
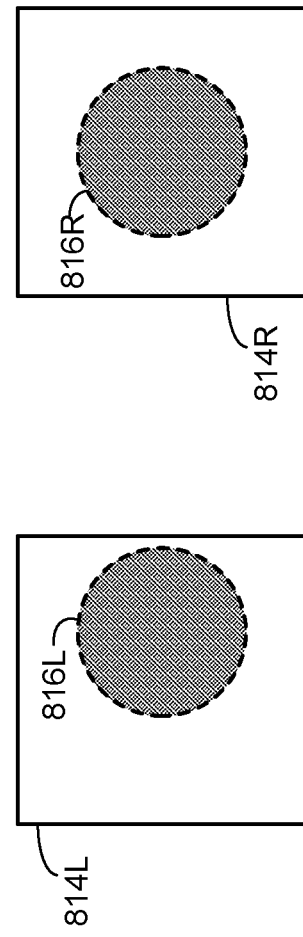

Based on the shifted position of the light pattern relative to the light sensor, as detected by the left optical sensor, a logic machine of the head-mounted display device may assess a left-side potential misalignment between the left display assembly and the left waveguide. In the example of FIGS. 8C and 8D, the logic machine may assess the potential misalignment of the display assembly as being approximately a 10° angular misalignment—e.g., the display assembly has an 80° angle relative to the plane of the waveguide, as opposed to the 90° perpendicular angle consistent with correct alignment in this example.

Such assessment may be done in any suitable way. As one example, the logic machine may use an algorithm that outputs an estimated angle between the display assembly and waveguide based at least in part on inputs including a position, size, shape, intensity, polarization, and/or estimated centroid of the light pattern relative to the light sensor. Additionally, or alternatively, the algorithm may output an estimated translational misalignment between the display assembly and waveguide, relative to the correct alignment between the two components. Such an algorithm may be pre-programmed, or developed via a suitable calibration process, as examples. In some cases, the algorithm may be dynamically updated—e.g., via a recalibration process. As another example, the logic machine may consult a pre-defined look-up table that correlates different light pattern profiles (e.g., size, shape, position, polarization, intensity) to different alignment angles and/or translational shifts of the display assembly relative to the optical sensor.

Notably, the scenario depicted in FIGS. 8C and 8D arises due to movement of the left display assembly relative to the left waveguide. Because the left-side test light is propagated by the left waveguide, which remains stationary as the display assembly and optical sensor move, the effective angle of the left-side test light entering the left optical sensor is affected. However, it will be understood that stereo misalignments may occur for other reasons besides rotational and/or translational movement of a display assembly relative to a waveguide. For instance, left waveguide 800L may move while the left display assembly and optical sensor remain stationary, resulting in a similar effective misalignment to the one illustrated by FIGS. 8C and 8D. Furthermore, as discussed above, intrinsic factors can affect the display light and test light provided by a display assembly, resulting in a stereo misalignment even when the display assembly, optical sensor, and waveguide all remain in alignment with one another. Regardless, a stereo misalignment caused by such intrinsic factors may still be detectable as discussed above, as it may result in a change to the angle, position, and/or intensity of the test light measured by the optical sensor.

Returning briefly to FIG. 5, at 512, the method includes assessing a right-side potential misalignment between the right display assembly and the right waveguide based at least in part on the right-side test light measured by the right optical sensor. This may be done substantially as described above with respect to the left-side test light. For instance, in FIGS. 8B and 8D, light pattern 816R is centered with respect to right light sensor 814R. Thus, the logic machine may assess the potential misalignment of the right display assembly by determining that there is no misalignment. In other words, the display assembly is correctly aligned with the waveguide—e.g., the angle of the display assembly relative to the plane of the waveguide is a 90° perpendicular angle, consistent with correct alignment.

Figure 9A:
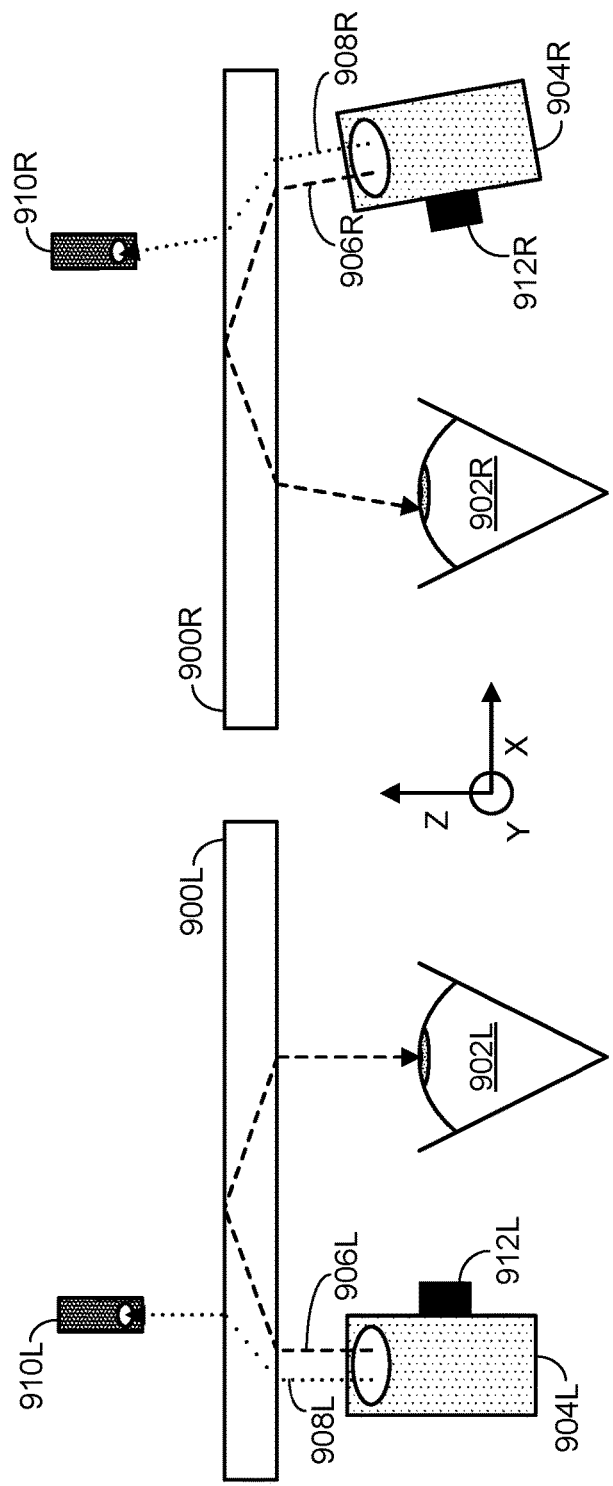
FIGS. 9A and 9B schematically illustrate assessing potential misalignments between display assemblies and waveguides of another example head-mounted display system.
Figure 9B:
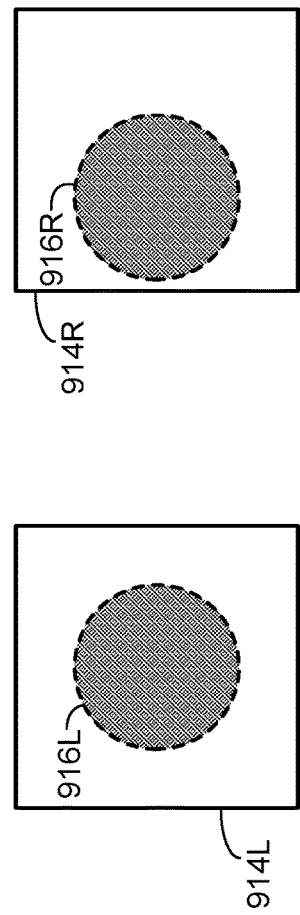

However, assessing a right-side potential misalignment is described in more detail with respect to FIGS. 9A and 9B. FIG. 9A shows an overhead view of different waveguides 900L and 900R of a different example head-mounted display system. Waveguides 900L and 900R are positioned in front of respective left and right user eyes 902L and 902R. A left display assembly 904L provides left-side display light 906L and left-side test light 908L, while a right display assembly 904R provides right-side display light 906R and right-side test light 908R. The left-side display light and right-side display light are respectively incoupled by the left and right waveguides, and outcoupled for viewing by the left and right user eyes. The left-side test light and right-side test light are incoupled by the left and right waveguides and outcoupled for measurement by a left optical sensor 910L and a right optical sensor 910R. FIG. 9A additionally shows a left IMU 912L coupled to left display assembly 904L, and a right IMU 912R coupled to right display assembly 904R.

In contrast to FIGS. 8A-E, optical sensors 910L and 910R are not coupled to their respective display assemblies. Rather, the optical sensors are shown positioned on the opposite sides of the waveguides from the display assemblies. Regardless, the test light provided by the display assemblies is still incoupled by the waveguides, and outcoupled for measurement by the optical sensors. In FIG. 9A, the display assemblies and optical sensors are shown spaced away from their corresponding waveguides. It will be understood that this is done only for the sake of visual clarity, to better illustrate the light paths between the display assemblies, waveguides, user eyes, and optical sensors. In some cases, the display assemblies and/or optical sensors may be closer to the waveguides than is shown in FIG. 9A. For instance, the display assemblies and/or optical sensors may be contacting or coupled to their respective waveguides.

Furthermore, it will be understood that the light paths shown in FIG. 9A corresponding to the left- and right-side display light, as well as the left- and right-side test light, are not intended to be an accurate representation of how light propagates through a waveguide, or between the various components of the head-mounted display system. Rather, FIGS. 9A and 9B are intended to illustrate the concept of how light provided by a display assembly can be redirected by a waveguide to a user eye or an optical sensor, and how such redirection can be affected by misalignments between the various components.

In FIG. 9A, the right display assembly 904R is misaligned relative to right waveguide 900R in the form of a 10° angular misalignment. In this example, both the waveguide and the optical sensor have remained stationary as the display assembly moved. This affects the angle of the right-side test light 908R measured by the right optical sensor, as is shown in FIG. 9B. This also affects the angle of the right-side display light 906R entering right user eye 902R, causing a stereo misalignment between the left and right display images.

FIG. 9B schematically shows example light sensors 914L of optical sensor 910L, and 914R of optical sensor 910R. FIG. 9B also shows a light pattern 916L, indicating portions of the left light sensor that are currently detecting left-side test light 908L provided by the left display assembly. Light pattern 916R represents portions of light sensor 914R that are detecting right-side test light 908R. More particularly, the positions of light patterns 916L and 916R relative to the respective light sensors shown in FIG. 9B is consistent with the scenario depicted in FIG. 9A. Thus, light pattern 916L is centered relative to light sensor 914L, while light pattern 916R is offset relative to what would be expected if the components were properly aligned. Accordingly, a logic machine of the head-mounted display system may assess the potential misalignment of the right display assembly by determining that the display assembly has a 10° angular misalignment. In other words, the display assembly has an angle of approximately 80° relative to the plane of the waveguide, as opposed to the 90° angle consistent with correct alignment.

In the example of FIGS. 9A and 9B, the misalignment is caused by movement of the right display assembly 904R relative to right waveguide 900R. It will be understood that a similar misalignment can occur if the display assembly remains stationary while the waveguide and optical sensor move. In either case, the misalignment may be detected based at least in part on the light pattern detected by the light sensor, as described above.

Returning briefly to FIG. 5, at 514, method 500 includes assessing a stereo alignment between the left display assembly and the right display assembly. This may be done based at least in part on an orientation of the left display assembly measured by a left IMU coupled to the left display assembly, and an orientation of the right display assembly measured by a right IMU coupled to the right display assembly.

This is schematically illustrated with respect to FIG. 8E, again showing an overhead view of waveguides 800L and 800R. In this example, waveguide 800L, along with left display assembly 804L, left optical sensor 810L, and left IMU 812L, are all misaligned relative to the right display components. This has the effect of changing the angle of the left display light 806L entering left user eye 802L, causing a stereo misalignment between the left and right display images. However, because the left waveguide, left display assembly, and left optical sensor all moved together, the angle and position of the left-side test light entering the left optical sensor is unaffected. Thus, a light pattern detected by the left optical sensor may still be substantially centered—e.g., as is shown in FIG. 8B.

Accordingly, in this scenario, the misalignment between the left and right display assemblies may be detected based on measurements from left IMU 812L and right IMU 812R. This may be done in any suitable way. In some examples, each IMU may be configured to output its current angular orientation (e.g., relative to a known gravity and/or magnet vector), which will correspond to the angular orientation of the display assembly that the IMU is coupled to. In cases where the two IMUs report different angular orientations, and/or either or both of the IMUs report angular orientations other than an orientation consistent with correct alignment, the logic machine may determine that the head-mounted display system is misaligned.

As another example, each IMU may be configured to report its current angular rate any time movement of the IMU is detected. By aggregating angular rate data over time, the logic machine may infer the approximate current orientation of the IMU, and therefore the orientation of the display assembly that the IMU is coupled to. More particularly, movement of one near-eye display relative to another may cause a differential in the rate output from respective gyroscopes of each IMU, and this is useable to detect a misalignment between the left and right displays.

Figure 8E:
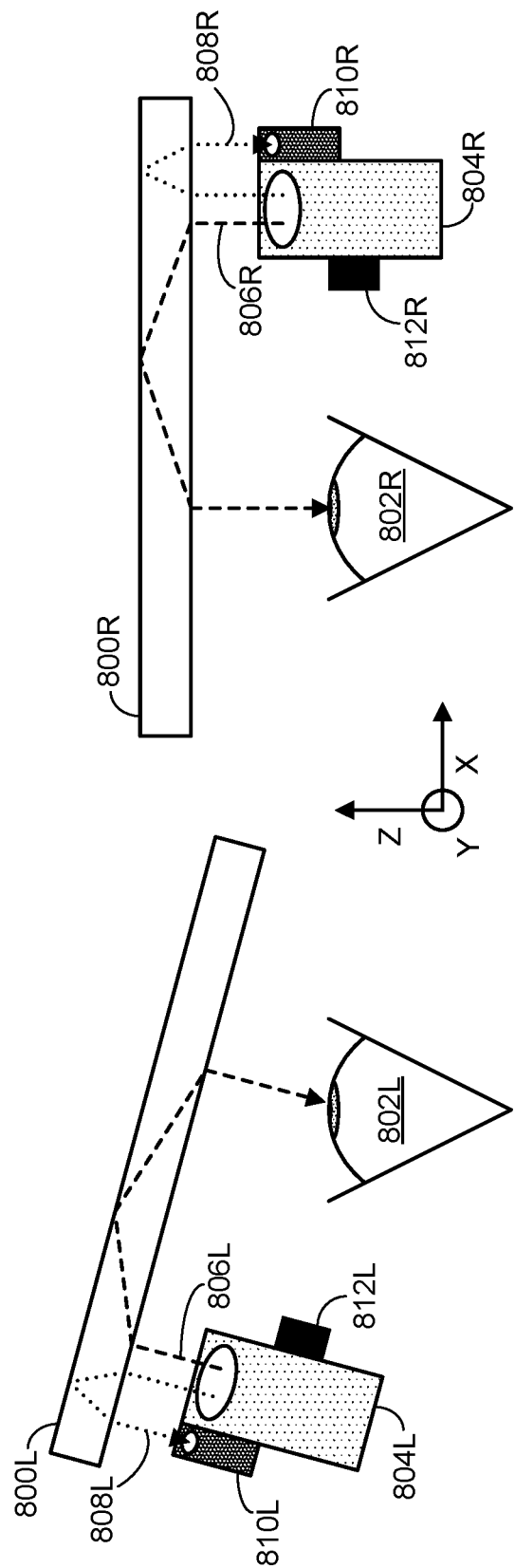

In any case, the logic machine assesses the angle and/or translational shift between the left and right display assemblies, based at least in part on data reported by the left and right IMUs. In the example of FIG. 8E, the logic machine may assess the orientation of the left display assembly as being approximately 15° relative to the right display assembly, causing a stereo misalignment of the left and right display images.

The present disclosure has thus far focused on a scenario where misalignment between a waveguide and its corresponding display assembly (e.g., a misalignment between waveguide 800L and display assembly 804L of FIG. 8C) is detected based on test light detected at an optical sensor. However, as discussed above, one or both near-eye displays may in some cases omit optical sensors, and the corresponding display assembly need not emit test light. Rather, each near-eye display may include a first IMU coupled to the display assembly, and a second IMU coupled to the waveguide—for example, second left IMU 613 shown in FIG. 6, and/or second right IMU 717 shown in FIG. 7.

In other words, the head-mounted display system may include a first left IMU configured to measure an orientation of the left display assembly, and a second left IMU configured to measure an orientation of the left waveguide. Similarly, the head-mounted display system may include a first right IMU configured to measure an orientation of the right display assembly and a second right IMU configured to measure an orientation of the right waveguide. The logic machine may then assess a stereo alignment for the left- and right-side display light based at least in part on the orientation of the left display assembly measured by the first left IMU, the orientation of the left waveguide measured by the second left IMU, the orientation of the right display assembly measured by the first right IMU and the orientation of the right waveguide measured by the second right IMU.

This may be done substantially as described above—e.g., alignment between a waveguide and a corresponding display assembly may be assessed based at least in part on a detected differential in the rate output from respective gyroscopes of the IMUs measuring the orientation of the waveguide and display assembly. For instance, each IMU may be configured to output its current angular orientation (e.g., relative to a known gravity and/or magnet vector), which will correspond to the angular orientation of the component that the IMU is coupled to. In cases where the IMU for a display assembly and the IMU for a corresponding waveguide report different angular orientations, and/or either or both of the IMUs report angular orientations other than an orientation consistent with correct alignment, the logic machine may determine that the display assembly and waveguide are out of alignment with one another.

As another example, each IMU may be configured to report its current angular rate any time movement of the IMU is detected. By aggregating angular rate data over time, the logic machine may infer the approximate current orientation of the IMU, and therefore the orientation of the component that the IMU is coupled to. More particularly, movement of one near-eye display relative to another may cause a differential in the rate output from respective gyroscopes of each IMU, and this is useable to detect a misalignment between the left and right displays.

The head-mounted display system may detect potential misalignments by comparing measurements output by any of the included IMUs. For example, the alignment of one display assembly relative to the other may be assessed based on measurements from the left and right display assembly IMUs, the alignment of one waveguide relative to the other may be assessed based on measurements from the left and right waveguide IMUs, and the alignment of a display assembly relative to its corresponding waveguide may be assessed based on measurements output by IMUs configured to measure the orientations of the display assembly and waveguide. In this manner, various types of strain applied to the head-mounted display system affecting the alignment of one or more components will likely be detectable by at least one IMU, enabling the misalignment to be detected by the logic machine.

As another example, the head-mounted display system may include two IMUs configured to measure the orientation of left- and right-side display assemblies as discussed above. The head-mounted display system may further include or interface with a head-tracking system that includes one or more head-tracking sensors. Rendering of virtual images for display to a user's eyes may in some cases be done based at least in part on an estimated pose of the head-mounted display system (e.g., a six degree-of-freedom position and orientation of the head-mounted display system) relative to a surrounding real-world environment. For instance, displayed images may create the appearance of a virtual object that appears to have a fixed position and orientation relative to a surrounding real or virtualized environment, even as the position and orientation of the head-mounted display change. Thus, a pose of the head-mounted display system may affect rendering of visual content.

However, this can be compromised by misalignment between the head-tracking system and display components of the head-mounted display system. As one example, the head-tracking system may be implemented as an external accessory that is removably attachable to the wearable frame assembly of the head-mounted display system. Strain applied to the head-mounted display system can affect the alignment of the head-tracking system or display components of the head-mounted display system, causing the displayed virtual imagery to appear to be inconsistent with the actual pose of the head-mounted display system. For example, application of an external force may cause the head-tracking accessory to become crooked relative to the head-mounted display system, meaning the virtual imagery may appear correspondingly crooked, as it is rendered for an incorrect pose.

As such, the head-tracking system may in some cases include one or more IMUs useable to measure an alignment of the head-tracking system with respect to components of the head-mounted display system. For example, a head-tracking accessory may include two additional IMUs configured to output the left-side and right-side orientations of the head-tracking system, such that the head-mounted display system receives input from four separate IMUs as described above.

To this end, FIG. 10 illustrates an example method 1000 for alignment assessment for a head-mounted display system. As with method 500, steps of method 1000 may be performed by any suitable device, having any suitable capabilities, hardware configuration, and form factor. Method 1000 may be implemented by any or all of the head-mounted display systems described herein. In some examples, steps of method 1000 may be performed by computing system 1500 described below with respect to FIG. 15.

Although steps of method 1000 are described in sequence, it will be understood that the steps need not be carried out sequentially. Rather, one or more steps of method 1000 may be performed in parallel. In some cases, method 1000 may be repeated or looped upon completion. In some cases, method 1000 may be run periodically (e.g., at a predetermined frequency), and/or run in response to one or more designated triggers—e.g., based on an on-board strain sensor of the head-mounted display system detecting strain.

At 1002, method 1000 includes measuring an orientation of a left display assembly via a left IMU, the left display assembly configured to provide left-side display light. At 1004, method 1000 includes measuring an assembly of a right display assembly via a right IMU, the right display assembly configured to provide right-side display light. This may be done substantially as described above. For example, FIG. 6 schematically shows an example left display assembly 404L that provides display light 602D, and a left IMU 612 configured to measure the orientation of the left display assembly. Similarly, FIG. 7 schematically shows an example right display assembly 702, and a right IMU 716 configured to measure the orientation of the right display assembly.

Figure 11:
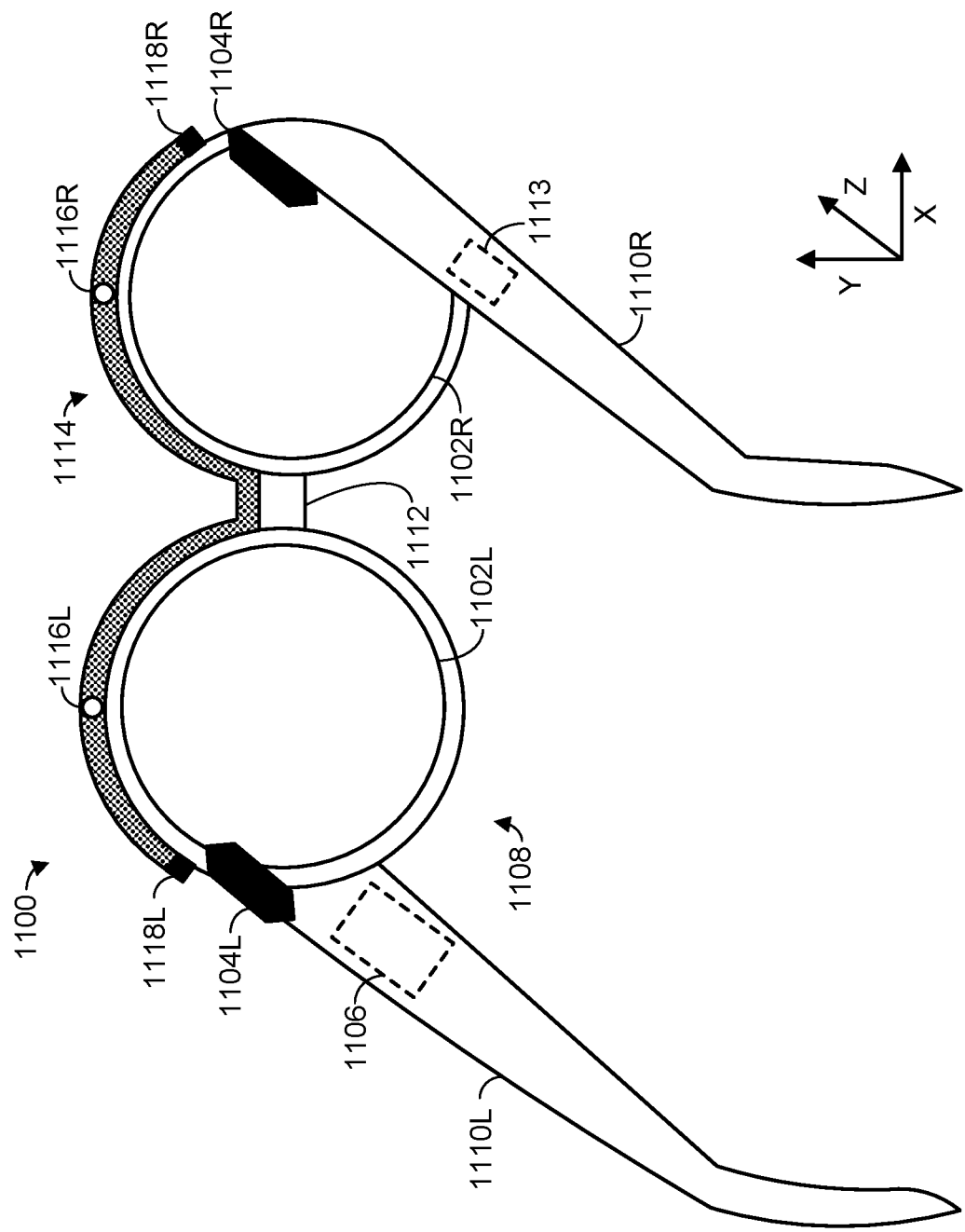
FIG. 11 schematically shows an example head-mounted display system including a head-tracking system.

At 1006, method 1000 includes receiving a left-side orientation of a head-tracking system as measured by a second left IMU, and a right-side orientation of a head-tracking system as measured by a second right IMU. This is schematically illustrated with respect to FIG. 11, showing another example head-mounted display system 1000. As with head-mounted display system 400, system 1100 includes a left waveguide 1102L and a left display assembly 1104L. The head-mounted display system further includes a right waveguide 1102R and a right display assembly 1104R. Operation of the display assemblies and/or other components of the head-mounted display system may be controlled by a logic machine, such as logic machine 1106, which may be implemented as described below with respect to FIG. 15. The head-mounted display system further includes a wearable frame assembly 1108, including circular frames surrounding left waveguide 1102L and right waveguide 1102R, a left temple support 1110L, a right temple support 1110R, and a bridge support 1112.

In FIG. 11, the head-mounted display system includes a communication interface 1113, which may be configured to receive orientations of a head-tracking system as measured by one or more IMUS. Specifically, head-mounted display system 1100 interfaces with a head-tracking system 1114, positioned above the circular frames and bridge support of wearable frame assembly 1108. The head-tracking system in this example takes the form of a head-tracking accessory that is removably attachable to the wearable frame assembly. In other words, the head-tracking system shown in FIG. 11 may be removable by a user. The head-tracking accessory may be an optional accessory sold with or separately from the head-mounted display system, as examples. Use of the head-tracking system may improve the head-tracking performance of the head-mounted display system, while beneficially allowing a user to reduce the bulk and improve the battery life of the head-mounted display system by optionally removing the head-tracking accessory.

It will be understood that the specific arrangement shown in FIG. 11 is a non-limiting example and is highly simplified for the sake of illustration. In general, a head-tracking accessory may have any suitable size and shape, and may have any suitable position with respect to the head-mounted display system. Furthermore, the head-tracking accessory may exchange data with the head-mounted display system in any suitable way. In FIG. 11, the head-mounted display system includes a communication interface 1113 configured to receive data from, and/or send data to, the head-tracking system. Data received by the communication interface may be transmitted to the logic machine and/or other suitable logic components. In some cases, the communication interface may be integrated into logic machine 1106. In general, the communication interface may take any suitable form, and may in some cases be implemented as communications interface 1510 described below with respect to FIG. 15.

Furthermore, it will be understood that the specific position of the communications interface as shown in FIG. 11 is non-limiting, and that a communications interface may have any suitable position with respect to other components of a head-mounted display system.

As one example, the head-mounted display system and head-tracking accessory may each include complementary conductive electrical pads or traces, which can be driven with an encoded signal to transmit data from one system to another. For instance, the head-mounted display system and head-tracking system may include suitable data ports—e.g., one system may include a male plug for insertion into a female receptacle, or data ports of the two systems may be coupled via a suitable cable. As another example, the head-mounted display system and head-tracking system may communicate via a suitable wireless communication protocol—e.g., one device may emit radio-frequency (RF) radiation for detection by a suitable receiver at the other device.

The head-tracking system generally includes one or more head-tracking sensors, configured to collect data relating to the pose of the head-tracking system. In the example of FIG. 11, head-tracking system 1114 includes head-tracking sensors 1116L and 1116R. In some cases, the head-tracking system may include on-board logic componentry configured to receive data from the one or more head-tracking sensors, and process the sensor data to estimate a pose of the head-tracking system. The estimated pose may then be transmitted to the head-mounted display system. Additionally, or alternatively, sensor data collected by the head-tracking system may be transmitted to the head-mounted display system, which may process the received sensor data to estimate the pose.

As one non-limiting example, the head-tracking sensors may include cameras configured to image the surrounding real-world environment. Pose estimation may be done using any suitable image-based pose estimation techniques. For example, images captured by the cameras may be processed to detect correspondences between pixels of the captured images and recognized landmarks having previously-known and/or assessed three-dimensional positions within the real-world environment. In this manner, the pose of the head-tracking system may be estimated based at least in part on the apparent positions, orientations, and sizes of the recognized landmarks within the images captured by the camera. Alternatively, pose assessment may be performed by on-board logic componentry of the head-tracking system. For example, images captured by the cameras may be transmitted to a logic machine integrated into the head-tracking system, which may perform image-based pose estimation and transmit the estimated pose of the head-tracking system to the logic machine of the head-mounted display system.

It will be understood that the head-tracking system may include any suitable sensors in addition to, or instead of, world-facing cameras. For example, the sensors may include radio-frequency (RF) sensors configured to detect RF radiation emitted by a plurality of RF positioning beacons distributed throughout the environment at known positions, and the RF signals detected at the head-tracking system may be triangulated to assess the pose of the head-tracking system. As additional non-limiting examples, the head-tracking system may use any or all of optical tracking (e.g., via one or more cameras), inertial tracking (e.g., via suitable accelerometers and/or gyroscopes), global-positioning system (GPS) tracking, etc.

However, as discussed, misalignment between the head-tracking system and the display components of the head-mounted display system can interfere with presentation of virtual imagery. For instance, this can cause presentation of virtual imagery that appears inconsistent with the actual pose of the head-mounted display system—e.g., because application of external strain has caused a misalignment between the head-mounted display system and the head-tracking system.

Accordingly, in FIG. 11, the head-tracking system includes a second left IMU 1118L configured to measure a left-side orientation of the head-tracking system, and a second right IMU 1118R configured to measure a right-side orientation of the head-tracking system. The head-mounted display system may receive the left- and right-side orientations of the head-tracking system via communications interface 1113.

In this example, the second left IMU and the second right IMU measure the left-side orientation and the right-side orientation of the same head-tracking system. In other words, both IMUs are integrated into the same physical housing, where the left IMU measures the orientation of the left side of the housing and the right IMU measures the orientation of the right side of the housing. This may, for instance, enable detection of bending or flexing of the head-tracking system and/or head-mounted display system in a manner that differently affects the left and right IMUs of the head-tracking system. As discussed above, in the example of FIG. 11, the head-tracking system takes the form of a head-tracking accessory that is removably attachable to the head-mounted display system. Thus, in this case, both the second left IMU and the second right IMU are integrated into the head-tracking accessory.

Figure 12:
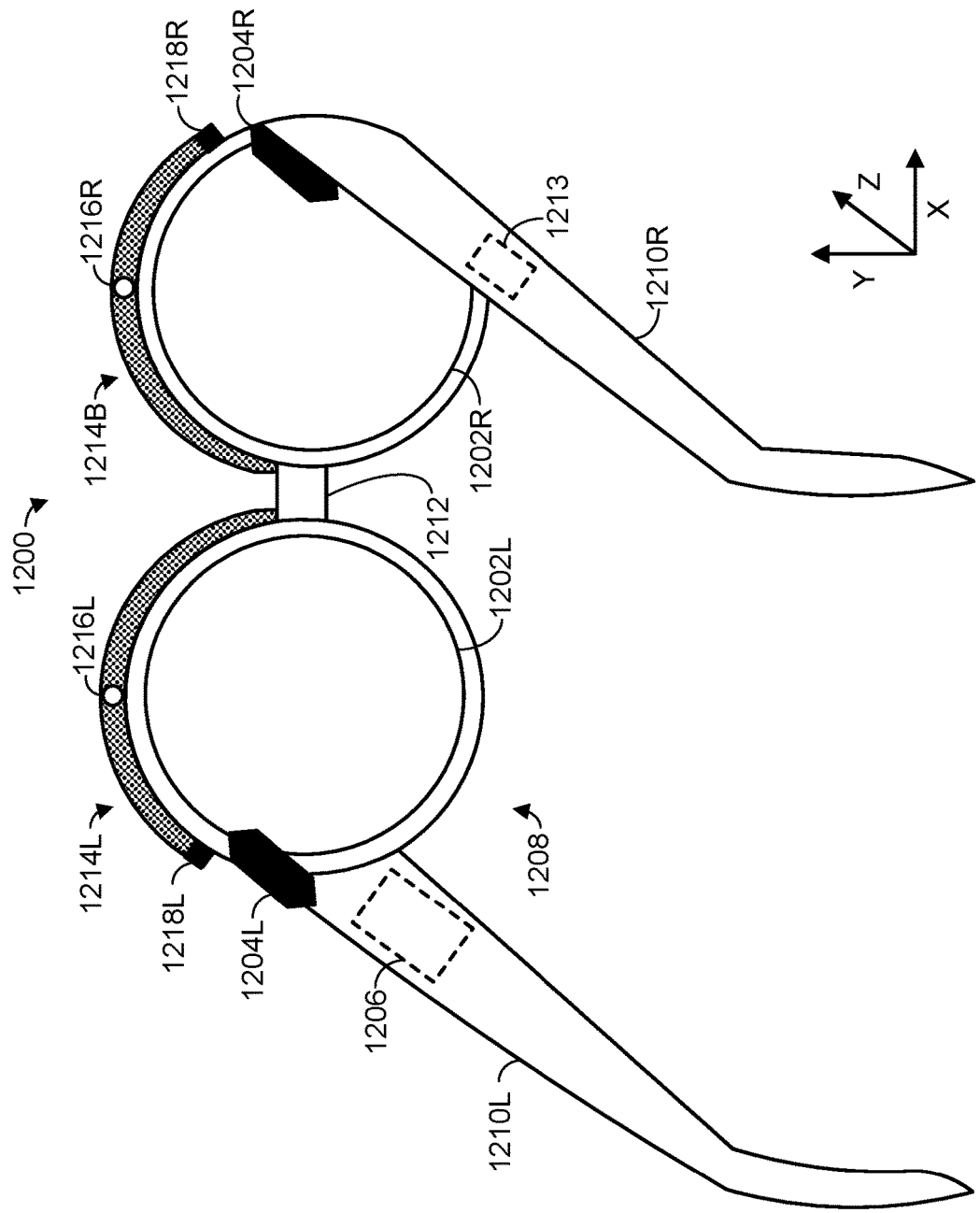
FIG. 12 schematically shows an example head-mounted display system including separate left- and right-side head-tracking systems.

However, it will be understood that this need not always be the case. FIG. 12 illustrates another example head-mounted display system 1200. As with system 1100, system 1200 includes a left waveguide 1202L and a left display assembly 1204L. The head-mounted display system further includes a right waveguide 1202R and a right display assembly 1204R. Operation of the display assemblies and/or other components of the head-mounted display system may be controlled by a logic machine, such as logic machine 1206, which may be implemented as described below with respect to FIG. 15. The head-mounted display system further includes a wearable frame assembly 1208, including circular frames surrounding left waveguide 1202L and right waveguide 1202R, a left temple support 1210L, a right temple support 1210R, and a bridge support 1212.

System 1200 further includes a communication interface 1213, which is configured to receive a left-side orientation of a head-tracking system as measured by a second left IMU, and a right-side orientation of a head-tracking system as measured by a second right IMU. However, in contrast to head-mounted display system 1100 of FIG. 11, head-mounted display system 1200 interfaces with two different head-tracking systems 1214L and 1214R. As with head-tracking system 1114, each of head-tracking systems 1214L and 1214R may be separate accessories that are removably attachable. Each head-tracking system includes a respective head-tracking sensor 1216L/R and a respective IMU 1218L/R. In other words, the left-side orientation measured by the second left IMU and received by communications interface 1213 is for left-side head-tracking system 1214A, while the right-side orientation measured by the second right IMU is for the right-side head-tracking system, separate from the left-side head-tracking system.

Figure 13:
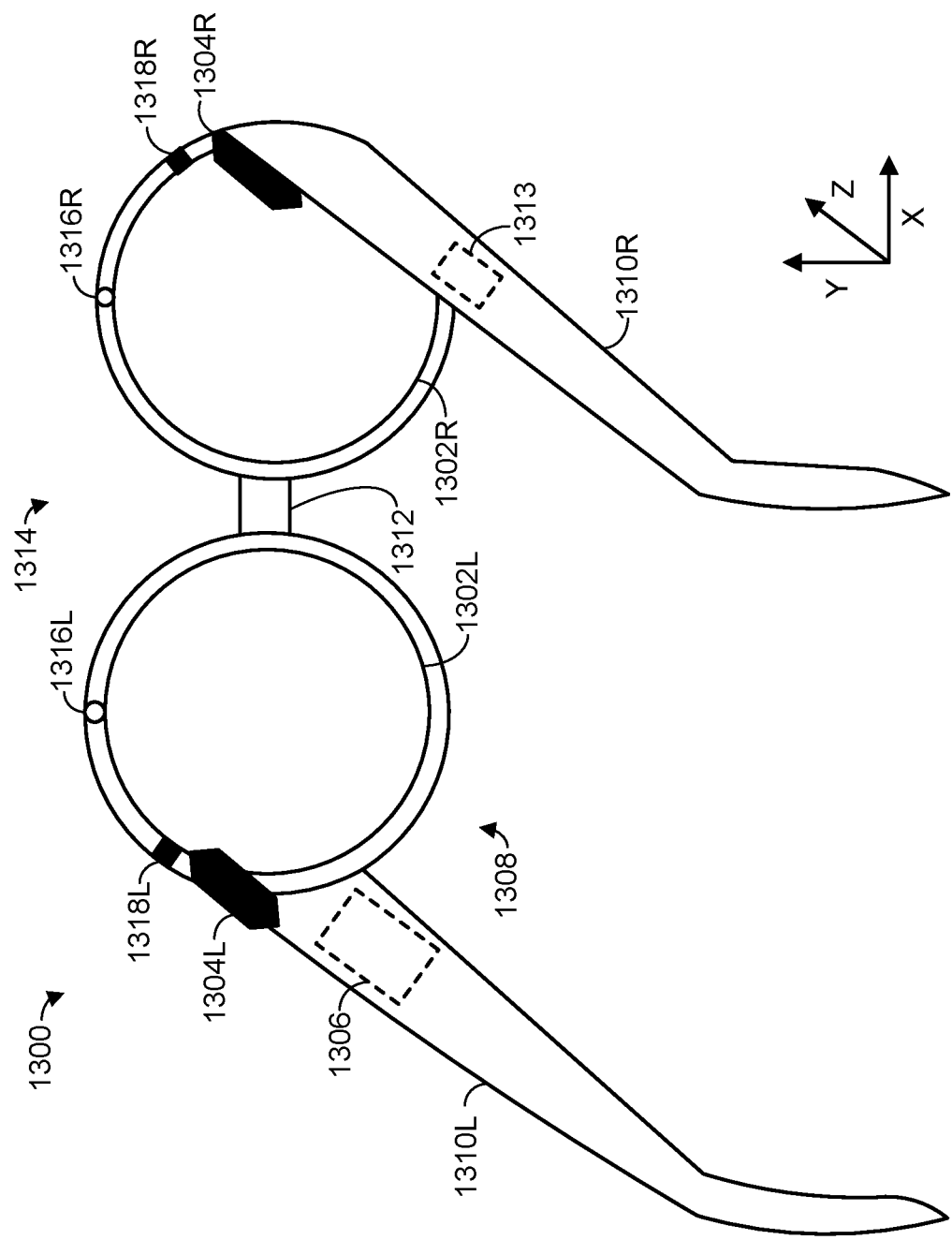
FIG. 13 schematically shows an example head-mounted display system including head-tracking sensors integrated into a wearable frame assembly.

In the above examples, the head-tracking system takes the form of a separate accessory that is removably attachable to the wearable frame assembly of the head-mounted display system. However, it will be understood that this need not always be the case. FIG. 13 illustrates another example head-mounted display system 1300. As with systems 1100 and 1200, system 1300 includes a left waveguide 1302L and a left display assembly 1304L. The head-mounted display system further includes a right waveguide 1302R and a right display assembly 1304R. Operation of the display assemblies and/or other components of the head-mounted display system may be controlled by a logic machine, such as logic machine 1306, which may be implemented as described below with respect to FIG. 15. The head-mounted display system further includes a wearable frame assembly 1308, including circular frames surrounding left waveguide 1302L and right waveguide 1302R, a left temple support 1310L, a right temple support 1310R, and a bridge support 1312.

System 1300 further includes a communication interface 1313, which is configured to receive a left-side orientation of a head-tracking system as measured by a second left IMU, and a right-side orientation of a head-tracking system as measured by a second right IMU. However, in this example, components of the head-tracking system 1314 are integrated into the wearable frame assembly of the head-mounted display system, as opposed to a separate removable accessory. Specifically, the head-tracking system includes head-tracking sensors 1316L/R, along with a second left IMU 1318L and a second right IMU 1318R integrated into the wearable frame assembly. Regardless, the communications interface may receive a left-side orientation and a right-side orientation of the head-tracking system as measured by the left- and right-side IMUs. This may, for example, enable a potential misalignment of a display assembly relative to the wearable frame assembly to be detected—e.g., a misalignment of the left display assembly may be detected by comparing the orientation of the left display assembly as measured by the first left IMU to the left-side orientation of the head-tracking system as measured by the second left IMU.

Returning briefly to FIG. 10, method 1000 includes, at 1008, assessing an alignment of the head-mounted display system based at least in part on the orientation of the left display assembly, the orientation of the right display assembly, the left-side orientation of the head-tracking system, and the right-side orientation of the head-tracking system. This may be done substantially as described above—e.g., alignment between the head-tracking system and display assemblies may be assessed based at least in part on a detected differential in the rate output from respective gyroscopes of the IMUs measuring the orientations of the head-tracking system and display assemblies. For instance, each IMU may be configured to output its current angular orientation (e.g., relative to a known gravity and/or magnet vector), which will correspond to the angular orientation of the component that the IMU is coupled to.

In cases where the IMU for a display assembly and the IMU for a corresponding side of the head-tracking system output measurements that are inconsistent with one another, and/or either or both of the IMUs report angular orientations other than an orientation consistent with correct alignment, the logic machine may determine that the display assembly and head-tracking system are out of alignment with one another. More particularly, assessing the alignment of the head-mounted display system may include comparing the orientation of the left display assembly to the left-side orientation of the head-tracking system, and comparing the orientation of the right display assembly to the right-side orientation of the head-tracking system.

As another example, each IMU may be configured to report its current angular rate any time movement of the IMU is detected. By aggregating angular rate data over time, the logic machine may infer the approximate current orientation of the IMU, and therefore the orientation of the component that the IMU is coupled to. More particularly, movement of one near-eye display relative to another may cause a differential in the rate output from respective gyroscopes of each IMU, and this is useable to detect a misalignment between the left and right displays.

Figure 14:
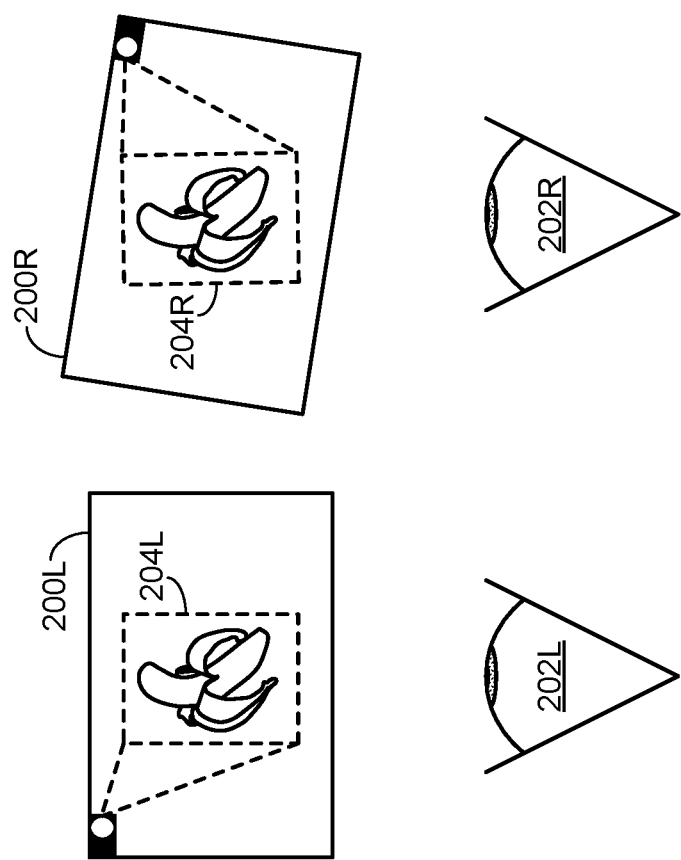
FIG. 14 schematically illustrates adjustment of display light to improve stereo alignment.

In some examples, upon detecting a misalignment via any of the processes described above, the logic machine may attempt to improve the stereo alignment of the left-side and right-side display light. This is schematically illustrated with respect to FIG. 14, again showing near-eye displays 200L and 200R, positioned in front of user eyes 202L and 202R. In this example, right near-eye display 200R is misaligned relative to left near-eye display 200L, which would ordinarily cause a stereo misalignment between left and right display images 204L and 204R. However, in this example, the logic machine of the head-mounted display system is adjusting the display light used to form right display image 204R to preserve stereo alignment with the left display image. In a different scenario, the logic machine may additionally or alternatively adjust the left-side display light.

Such adjustment may be done in any suitable way. In some cases, adjusting the display light can include adjusting the display space angle of the image displayed by the display assembly. As another example, the display assembly may include one or more steerable mirrors that direct the display light out of the pupil of the display assembly, and by controlling the orientation of the one or more steerable mirrors, the angle of the display light entering the waveguide may be adjusted—e.g., to counteract a detected misalignment in the head-mounted display system.

As another example, the logic machine may be configured to improve the stereo alignment by horizontally and/or vertically shifting or rotating one or both of a left display image of the left-side display light and a right display image of the right-side display light. Notably, this may be done in image space and/or in display space. For example, the display light may be controlled to change a two-dimensional position at which the display image is visible relative to the surface of the waveguide—e.g., to preserve alignment between the display image and a user eye, even when components of the head-mounted display system are misaligned. Additionally, or alternatively, the spatial modulation of the display light may be changed, such that different pixels are used to form the image, without changing the angle or path of the display light.

Additionally, or alternatively, the logic machine may present a notification to a user upon detecting a misalignment. In this manner, regardless of whether the logic machine takes any action to adjust the display light and improve the stereo alignment, the user may be notified that components of the head-mounted display system appear to be misaligned—e.g., due to bending or flexing of a frame of the system. Thus, the user may take manual action to alleviate the misalignment.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 15:
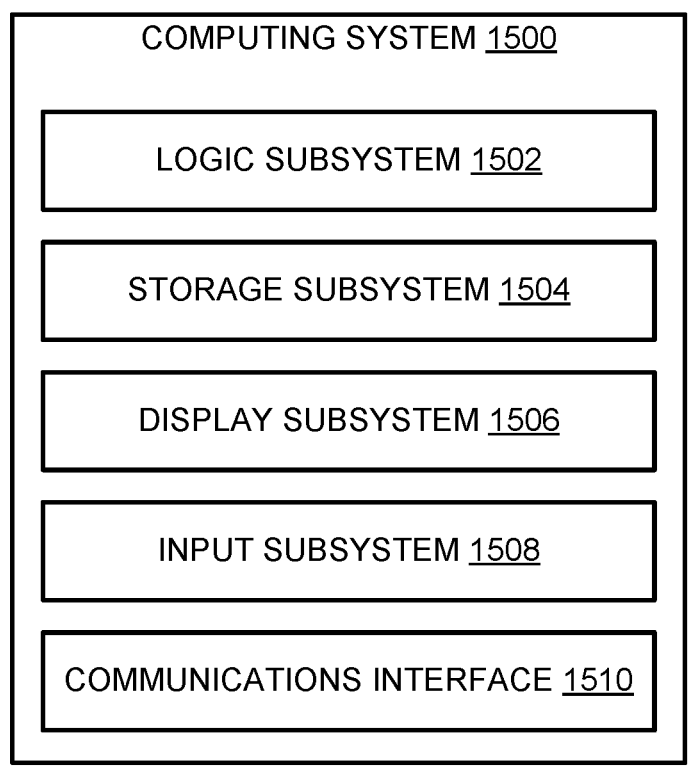
FIG. 15 schematically shows an example computing system.

FIG. 15 schematically shows a simplified representation of a computing system 1500 configured to provide any to all of the compute functionality described herein. Computing system 1500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1500 includes a logic subsystem 1502 and a storage subsystem 1504. Computing system 1500 may optionally include a display subsystem 1506, input subsystem 1508, communication subsystem 1510, and/or other subsystems not shown in FIG. 15.

Logic subsystem 1502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1504 includes one or more physical devices configured to temporarily and/or permanently hold computer information such as data and instructions executable by the logic subsystem. When the storage subsystem includes two or more devices, the devices may be collocated and/or remotely located. Storage subsystem 1504 may include volatile, nonvolatile, dynamic, static, read/write, read-only, random-access, sequential-access, location-addressable, file-addressable, and/or content-addressable devices. Storage subsystem 1504 may include removable and/or built-in devices. When the logic subsystem executes instructions, the state of storage subsystem 1504 may be transformed—e.g., to hold different data.

Aspects of logic subsystem 1502 and storage subsystem 1504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1506 may be used to present a visual representation of data held by storage subsystem 1504. This visual representation may take the form of a graphical user interface (GUI). Display subsystem 1506 may include one or more display devices utilizing virtually any type of technology. In some implementations, display subsystem may include one or more virtual-, augmented-, or mixed reality displays.

When included, input subsystem 1508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1510 may be configured to communicatively couple computing system 1500 with one or more other computing devices. Communication subsystem 1510 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a head-mounted display system comprises: a left display assembly configured to provide left-side display light; a first left inertial measurement unit (IMU) configured to measure an orientation of the left display assembly; a right display assembly configured to provide right-side display light; a first right IMU configured to measure an orientation of the right display assembly; a communication interface configured to receive a left-side orientation of a head-tracking system as measured by a second left IMU, and a right-side orientation of a head-tracking system as measured by a second right IMU; a logic machine configured to assess an alignment of the head-mounted display system based at least in part on the orientation of the left display assembly, the orientation of the right display assembly, the left-side orientation of the head-tracking system, and the right-side orientation of the head-tracking system. In this example or any other example, the second left IMU and the second right IMU measure the left-side orientation and the right-side orientation of the same head-tracking system. In this example or any other example, the head-mounted display system further comprises a wearable frame assembly coupled to the left display assembly and the right display assembly, and wherein the head-tracking system includes a head-tracking accessory that is removably attachable to the wearable frame assembly, and the second left IMU and the second right IMU are integrated into the head-tracking accessory. In this example or any other example, the head-mounted display system further comprises a wearable frame assembly coupled to the left display assembly and the right display assembly, and wherein the second left IMU and the second right IMU are integrated into the wearable frame assembly. In this example or any other example, the head-tracking system includes one or more cameras configured to image a surrounding real-world environment. In this example or any other example, the left-side orientation measured by the second left IMU is for a left-side head-tracking system, and the right-side orientation measured by the second right IMU is for a right-side head-tracking system, separate from the left-side head-tracking system. In this example or any other example, assessing the alignment of the head-mounted display system includes comparing the orientation of the left display assembly to the left-side orientation of the head-tracking system, and comparing the orientation of the right display assembly to the right-side orientation of the head-tracking system. In this example or any other example, the head-mounted display system further comprises a left waveguide configured to incouple the left-side display light and outcouple the left-side display light for viewing at a left eyebox, and a right waveguide configured to incouple the right-side display light and outcouple the right-side display light for viewing at a right eyebox. In this example or any other example, the left display assembly includes a left liquid crystal on silicon (LCOS) display and the right display assembly includes a right LCOS display. In this example or any other example, the left display assembly includes one of a left microopto-electromechanical system (MOEMS) projector display, a left micro light-emitting diode (µLED) display, or a left dot matrix display, and the right display assembly includes one of a right MOEMS projector display, a right µLED display, or a right dot matrix display. In this example or any other example, the logic machine is further configured to improve a stereo alignment between the left- and right-side display light by adjusting one or both of the left- and right-side display light. In this example or any other example, the logic machine is further configured to improve a stereo alignment between the left- and right-side display light by horizontally and/or vertically shifting or rotating one or both of a left display image of the left-side display light and a right display image of the right-side display light.

In an example, a method for alignment assessment for a head-mounted display system comprises: measuring an orientation of a left display assembly via a first left inertial measurement unit (IMU), the left display assembly configured to provide left-side display light; measuring an orientation of a right display assembly via a right IMU, the right display assembly configured to provide right-side display light; receiving a left-side orientation of a head-tracking system as measured by a second left IMU and a right-side orientation of a head-tracking system as measured by a second right IMU; and assessing an alignment of the head-mounted display system based at least in part on the orientation of the left display assembly, the orientation of the right display assembly, the left-side orientation of the head-tracking system, and the right-side orientation of the head-tracking system. In this example or any other example, the second left IMU and the second right IMU measure the left-side orientation and the right-side orientation of the same head-tracking system. In this example or any other example, the head-mounted display system includes a wearable frame assembly coupled to the left display assembly and the right display assembly, and wherein the head-tracking system includes a head-tracking accessory that is removably attachable to the wearable frame assembly, and the second left IMU and the second right IMU are integrated into the head-tracking accessory. In this example or any other example, assessing the alignment of the head-mounted display system includes comparing the orientation of the left display assembly to the left-side orientation of the head-tracking system, and comparing the orientation of the right display assembly to the right-side orientation of the head-tracking system. In this example or any other example, the head-mounted display system includes a left waveguide configured to incouple the left-side display light and outcouple the left-side display light for viewing at a left eyebox, and a right waveguide configured to incouple the right-side display light and outcouple the right-side display light for viewing at a right eyebox. In this example or any other example, the method further comprises improving a stereo alignment between the left- and right-side display light by adjusting one or both of the left- and right-side display light. In this example or any other example, the method further comprises improving a stereo alignment between the left- and right-side display light by horizontally and/or vertically shifting or rotating one or both of a left display image of the left-side display light and a right display image of the right-side display light.

In an example, a head-mounted display system comprises: a left display assembly configured to provide left-side display light; a first left inertial measurement unit (IMU) configured to measure an orientation of the left display assembly; a left waveguide configured to incouple the left-side display light from the left display assembly and outcouple the left-side display light for viewing at a left eyebox; a second left IMU configured to measure an orientation of the left waveguide; a right display assembly configured to provide right-side display light; a first right IMU configured to measure an orientation of the right display assembly; a right waveguide configured to incouple the right-side display light from the right display assembly and outcouple the right-side display light for viewing at a right eyebox; a second right IMU configured to measure an orientation of the right waveguide; and a logic machine configured to assess a stereo alignment for the left- and right-side display light based at least in part on the orientation of the left display assembly, the orientation of the left waveguide, the orientation of the right display assembly, and the orientation of the right waveguide.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display system, comprising:
a left display assembly configured to provide left-side display light;
a first left inertial measurement unit (IMU) configured to measure an orientation of the left display assembly;
a right display assembly configured to provide right-side display light;
a first right IMU configured to measure an orientation of the right display assembly;
a communication interface configured to receive a left-side orientation of a head-tracking system as measured by a second left IMU, and a right-side orientation of a head-tracking system as measured by a second right IMU;
a logic machine configured to assess an alignment of the head-mounted display system based at least in part on the orientation of the left display assembly, the orientation of the right display assembly, the left-side orientation of the head-tracking system, and the right-side orientation of the head-tracking system.

2. The head-mounted display system of claim 1, wherein the second left IMU and the second right IMU measure the left-side orientation and the right-side orientation of the same head-tracking system.

3. The head-mounted display system of claim 2, further comprising a wearable frame assembly coupled to the left display assembly and the right display assembly, and wherein the head-tracking system includes a head-tracking accessory that is removably attachable to the wearable frame assembly, and the second left IMU and the second right IMU are integrated into the head-tracking accessory.

4. The head-mounted display system of claim 2, further comprising a wearable frame assembly coupled to the left display assembly and the right display assembly, and wherein the second left IMU and the second right IMU are integrated into the wearable frame assembly.

5. The head-mounted display system of claim 2, wherein the head-tracking system includes one or more cameras configured to image a surrounding real-world environment.

6. The head-mounted display system of claim 1, wherein the left-side orientation measured by the second left IMU is for a left-side head-tracking system, and the right-side orientation measured by the second right IMU is for a right-side head-tracking system, separate from the left-side head-tracking system.

7. The head-mounted display system of claim 1, wherein assessing the alignment of the head-mounted display system includes comparing the orientation of the left display assembly to the left-side orientation of the head-tracking system, and comparing the orientation of the right display assembly to the right-side orientation of the head-tracking system.

8. The head-mounted display system of claim 1, further comprising a left waveguide configured to incouple the left-side display light and outcouple the left-side display light for viewing at a left eyebox, and a right waveguide configured to incouple the right-side display light and outcouple the right-side display light for viewing at a right eyebox.

9. The head-mounted display system of claim 1, wherein the left display assembly includes a left liquid crystal on silicon (LCOS) display and the right display assembly includes a right LCOS display.

10. The head-mounted display system of claim 1, wherein the left display assembly includes one of a left microopto-electromechanical system (MOEMS) projector display, a left micro light-emitting diode (µLED) display, or a left dot matrix display, and the right display assembly includes one of a right MOEMS projector display, a right µLED display, or a right dot matrix display.

11. The head-mounted display system of claim 1, wherein the logic machine is further configured to improve a stereo alignment between the left- and right-side display light by adjusting one or both of the left- and right-side display light.

12. The head-mounted display system of claim 1, wherein the logic machine is further configured to improve a stereo alignment between the left- and right-side display light by horizontally and/or vertically shifting or rotating one or both of a left display image of the left-side display light and a right display image of the right-side display light.

13. A method for alignment assessment for a head-mounted display system, the method comprising:
measuring an orientation of a left display assembly via a first left inertial measurement unit (IMU), the left display assembly configured to provide left-side display light;
measuring an orientation of a right display assembly via a right IMU, the right display assembly configured to provide right-side display light;
receiving a left-side orientation of a head-tracking system as measured by a second left IMU and a right-side orientation of a head-tracking system as measured by a second right IMU; and
assessing an alignment of the head-mounted display system based at least in part on the orientation of the left display assembly, the orientation of the right display assembly, the left-side orientation of the head-tracking system, and the right-side orientation of the head-tracking system.

14. The method of claim 13, wherein the second left IMU and the second right IMU measure the left-side orientation and the right-side orientation of the same head-tracking system.

15. The method of claim 14, wherein the head-mounted display system includes a wearable frame assembly coupled to the left display assembly and the right display assembly, and wherein the head-tracking system includes a head-tracking accessory that is removably attachable to the wearable frame assembly, and the second left IMU and the second right IMU are integrated into the head-tracking accessory.

16. The method of claim 13, wherein assessing the alignment of the head-mounted display system includes comparing the orientation of the left display assembly to the left-side orientation of the head-tracking system, and comparing the orientation of the right display assembly to the right-side orientation of the head-tracking system.

17. The method of claim 13, wherein the head-mounted display system includes a left waveguide configured to incouple the left-side display light and outcouple the left-side display light for viewing at a left eyebox, and a right waveguide configured to incouple the right-side display light and outcouple the right-side display light for viewing at a right eyebox.

18. The method of claim 13, further comprising improving a stereo alignment between the left- and right-side display light by adjusting one or both of the left- and right-side display light.

19. The method of claim 13, further comprising improving a stereo alignment between the left- and right-side display light by horizontally and/or vertically shifting or rotating one or both of a left display image of the left-side display light and a right display image of the right-side display light.

20. A head-mounted display system, comprising:
a left display assembly configured to provide left-side display light;
a first left inertial measurement unit (IMU) configured to measure an orientation of the left display assembly;
a left waveguide configured to incouple the left-side display light from the left display assembly and outcouple the left-side display light for viewing at a left eyebox;
a second left IMU configured to measure an orientation of the left waveguide;
a right display assembly configured to provide right-side display light;
a first right IMU configured to measure an orientation of the right display assembly;
a right waveguide configured to incouple the right-side display light from the right display assembly and outcouple the right-side display light for viewing at a right eyebox;
a second right IMU configured to measure an orientation of the right waveguide; and
a logic machine configured to assess a stereo alignment for the left- and right-side display light based at least in part on the orientation of the left display assembly, the orientation of the left waveguide, the orientation of the right display assembly, and the orientation of the right waveguide.

\* \* \* \* \*